US012620886B2

(12) United States Patent
Inam

(10) Patent No.: US 12,620,886 B2
(45) Date of Patent: May 5, 2026

(54) MULTIPORT TRANSFORMER ENABLED MODULAR MULTIPORT POWER CONVERSION SYSTEM

(71) Applicant: DG Matrix, Inc., Raleigh, NC (US)

(72) Inventor: Haroon Inam, Raleigh, NC (US)

(73) Assignee: DG Matrix, Inc., Raleigh, NC (US)

( * ) Notice: Subject to any disclaimer, the term of this patent is extended or adjusted under 35 U.S.C. 154(b) by 0 days.

(21) Appl. No.: 19/289,771

(22) Filed: Aug. 4, 2025

(65) Prior Publication Data

US 2025/0357842 A1     Nov. 20, 2025

Related U.S. Application Data

(63) Continuation-in-part of application No. 18/627,004, filed on Apr. 4, 2024.

(60) Provisional application No. 63/458,805, filed on Apr. 12, 2023.

(51) Int. Cl.
*H02M 1/00*          (2007.01)
*H02M 1/08*          (2006.01)

(52) U.S. Cl.
CPC ......... *H02M 1/009* (2021.05); *H02M 1/0009* (2021.05); *H02M 1/083* (2013.01)

(58) Field of Classification Search
CPC ..... H02M 1/009; H02M 1/0009; H02M 1/083
See application file for complete search history.

(56) References Cited

U.S. PATENT DOCUMENTS

| | | | |
|---|---|---|---|
| 6,381,155 B1 | 4/2002 | Kadatsky et al. | |
| 8,154,887 B2 * | 4/2012 | Hinds ............... | H02M 3/33569 363/15 |
| RE43,572 E | 8/2012 | West | |
| 9,397,580 B1 | 7/2016 | Alexander | |
| 9,489,701 B2 | 11/2016 | Emadi et al. | |
| 9,645,596 B1 | 5/2017 | Lee et al. | |
| 9,647,568 B1 | 5/2017 | Bundschuh et al. | |
| 9,866,016 B2 | 1/2018 | Terlizzi et al. | |
| 9,871,379 B2 | 1/2018 | Cheng et al. | |

(Continued)

FOREIGN PATENT DOCUMENTS

| | | | | |
|---|---|---|---|---|
| AU | 4899200 A | * | 11/2000 | |
| CN | 101320942 B | * | 1/2013 | ........ H02J 13/00007 |

(Continued)

OTHER PUBLICATIONS

Machine Translation CN-101320942-B (Year: 2008).*

(Continued)

*Primary Examiner* — Yahveh Comas Torres
(74) *Attorney, Agent, or Firm* — Neo IP

(57)          ABSTRACT

A modular, multiport power conversion system includes a central transformer with a plurality of windings inductively connected to the central transformer. The plurality of windings are connected to ports able to connect to both AC and DC-devices, including both power sources and power consuming nodes. Each port is able to be selectively galvanically isolated, such that a controller is able to determine from which ports power is drawn and/or to which ports power is transferred. The system is operable to use zero voltage switching (ZVS) and/or zero current switching (ZCS) for each port to reduce power loss and increase efficiency, especially for high frequency embodiments.

22 Claims, 13 Drawing Sheets

(56) References Cited

U.S. PATENT DOCUMENTS

| | | | |
|---|---|---|---|
| 9,973,107 | B2 | 5/2018 | Cerqueira Pinto Bezerra Varajão et al. |
| 10,005,371 | B2 | 6/2018 | Reineccius et al. |
| 10,110,010 | B2 | 10/2018 | Lucas et al. |
| 10,135,251 | B2 | 11/2018 | Berard |
| 10,439,432 | B2 | 10/2019 | Eckhardt et al. |
| 10,522,306 | B2 | 12/2019 | White et al. |
| 10,608,545 | B2 | 3/2020 | Keister et al. |
| 10,734,914 | B2 | 8/2020 | Azidehak et al. |
| 10,756,546 | B2 | 8/2020 | Pmsvvsv et al. |
| 10,882,412 | B2 | 1/2021 | Mrlik et al. |
| 11,011,913 | B2 | 5/2021 | Smith et al. |
| 11,031,785 | B1 | 6/2021 | Erokhovets |
| 11,063,579 | B2 | 7/2021 | Beddingfield et al. |
| 11,108,235 | B1 | 8/2021 | Awal et al. |
| 11,196,338 | B2 | 12/2021 | Beddingfield et al. |
| 11,251,620 | B2 | 2/2022 | Cai et al. |
| 11,283,262 | B2 | 3/2022 | Arslan et al. |
| 11,399,065 | B1 | 7/2022 | Thirumurthy et al. |
| 11,491,883 | B2 | 11/2022 | Khaligh et al. |
| 11,509,128 | B2 | 11/2022 | Song et al. |
| 11,588,397 | B2 | 2/2023 | Zhu et al. |
| 11,807,123 | B1 | 11/2023 | Seroff et al. |
| 11,824,461 | B2 | 11/2023 | Bhattacharya et al. |
| 11,831,236 | B2 * | 11/2023 | Dai ..................... H02M 7/797 |
| 12,316,226 | B2 * | 5/2025 | Suzuki ................. H02M 7/797 |
| 2004/0017110 | A1 | 1/2004 | Yim |
| 2004/0037274 | A1 | 2/2004 | Osawa et al. |
| 2005/0248964 | A1 | 11/2005 | Dalal |
| 2009/0018706 | A1 | 1/2009 | Wittner |
| 2011/0035070 | A1 | 2/2011 | Kanai |
| 2011/0204720 | A1 | 8/2011 | Ruiz et al. |
| 2012/0091811 | A1 | 4/2012 | Heidenreich et al. |
| 2012/0205982 | A1 | 8/2012 | Navarro et al. |
| 2013/0241291 | A1 | 9/2013 | Wang |
| 2014/0032147 | A1 | 1/2014 | Verhulst et al. |
| 2015/0015071 | A1 | 1/2015 | Deboy et al. |
| 2015/0180350 | A1 | 6/2015 | Huang et al. |
| 2015/0280594 | A1 * | 10/2015 | Lin ......................... H02M 3/28 363/21.04 |
| 2015/0372604 | A1 | 12/2015 | Balakrishnan et al. |
| 2016/0137087 | A1 | 5/2016 | Haas et al. |
| 2017/0117913 | A1 | 4/2017 | Yamamoto et al. |
| 2017/0133879 | A1 | 5/2017 | Eckhardt et al. |
| 2018/0090987 | A1 | 3/2018 | Hashimoto |
| 2018/0198377 | A1 * | 7/2018 | Keister ............... H02M 5/4585 |
| 2018/0358839 | A1 | 12/2018 | Perez et al. |
| 2019/0312441 | A1 | 10/2019 | Ballantine et al. |
| 2020/0103453 | A1 | 4/2020 | Roxenborg et al. |
| 2020/0186043 | A1 | 6/2020 | Park et al. |
| 2020/0259325 | A1 | 8/2020 | Li et al. |
| 2020/0313539 | A1 * | 10/2020 | Hall .................... H02M 1/4233 |
| 2021/0012944 | A1 | 1/2021 | Beddingfield et al. |
| 2021/0408937 | A1 | 12/2021 | Bhattacharya et al. |
| 2022/0103858 | A1 | 3/2022 | Jang et al. |
| 2022/0161677 | A1 | 5/2022 | Pizzurro et al. |
| 2022/0199302 | A1 | 6/2022 | Beddingfield et al. |
| 2022/0206047 | A1 * | 6/2022 | Curt ..................... G01R 21/133 |
| 2022/0216728 | A1 | 7/2022 | Ashman et al. |
| 2022/0321016 | A1 * | 10/2022 | Khaligh ............ H02M 3/33561 |
| 2022/0393505 | A1 | 12/2022 | Marzano et al. |
| 2022/0399722 | A1 | 12/2022 | Dennis et al. |
| 2022/0402390 | A1 | 12/2022 | Smolenaers |
| 2023/0022784 | A1 * | 1/2023 | Suzuki ................. H02M 3/285 |
| 2023/0108060 | A1 | 4/2023 | Krishnamoorthy et al. |
| 2023/0170783 | A1 | 6/2023 | Tian et al. |
| 2023/0314491 | A1 | 10/2023 | Kulkarni et al. |
| 2023/0318435 | A1 | 10/2023 | Yuan et al. |
| 2023/0327574 | A1 | 10/2023 | Hawes et al. |
| 2023/0387780 | A1 * | 11/2023 | Zhuang ................ H02M 7/217 |
| 2023/0406126 | A1 | 12/2023 | Mauger et al. |
| 2024/0088776 | A1 | 3/2024 | Kadam et al. |
| 2024/0113526 | A1 | 4/2024 | Miranbeigi et al. |
| 2024/0120739 | A1 | 4/2024 | Miranbeigi et al. |
| 2024/0128764 | A1 | 4/2024 | Mitsugi |
| 2024/0348171 | A1 | 10/2024 | Inam |
| 2024/0356333 | A1 | 10/2024 | Kasicheyanula et al. |
| 2025/0079839 | A1 | 3/2025 | Inam |
| 2025/0222793 | A1 | 7/2025 | Su et al. |
| 2025/0279730 | A1 | 9/2025 | Liu et al. |

FOREIGN PATENT DOCUMENTS

| | | | | |
|---|---|---|---|---|
| CN | 106452136 | A | 2/2017 | |
| EP | 3125392 | B1 * | 3/2019 | ........ H02M 3/33584 |
| KR | 102308764 | B1 | 10/2021 | |
| WO | 2021090108 | A1 | 5/2021 | |
| WO | 2021226104 | A1 | 11/2021 | |
| WO | 2022046959 | A1 | 3/2022 | |
| WO | 2022103858 | A1 | 5/2022 | |
| WO | 2022173791 | A1 | 8/2022 | |
| WO | 2022173800 | A1 | 8/2022 | |
| WO | 2022216738 | A1 | 10/2022 | |
| WO | 2023288248 | A2 | 1/2023 | |

OTHER PUBLICATIONS

Neubert, M. (2020). "Modeling, synthesis and operation of multiport-active bridge converters" (Doctoral dissertation, Dissertation, Rheinisch-Westfälische Technische Hochschule Aachen, 2020 (Year: 2020).*

Tao, H., Kotsopoulos, A., Duarte, J. L., & Hendrix, M. A. (2006). Family of multiport bidirectional DC-DC converters. IEE Proceedings—Electric Power Applications, 153(3), 451-458. (Year: 2006).*

Chattopadhyay, Ritwik, Three Port Transformer Isolated Phase Shifted DC-DC Converter Design & Control for Renewable Energy Source and Energy Storage Integration, NC State Dissertation published Aug. 16, 2018.

Kado, Y., D. Shichijo, K. Wada, and K. Iwatsuki (2016), Multiport power router and its impact on future smart grids, Radio Sci., 51, 1234-1246, doi:10.1002/2016RS006041.

Krishnaswami, Hariharan, Three-port DC-DC Converters to Interface Renewable Energy Sources with Bi-directional Load and Energy, University of Minnesota Dissertation published Aug. 2009.

M. La Mendola et al., "Four-Port Bidirectional Dual Active Bridge Converter for EVs Fast Charging," Roma Tre University, published 2019.

M. Rashidi, N. N. Altin, S. S. Ozdemir, A. Bani-Ahmed and A. Nasiri, "Design and Development of a High-Frequency Multiport Solid-State Transformer With Decoupled Control Scheme," in IEEE Transactions on Industry Applications, vol. 55, No. 6, pp. 7515-7526, Nov.-Dec. 2019, doi: 10.1109/TIA.2019.2939741.

Mohamed A. Elkeiy et al., "Multiport DC-DC Converter with Differential Power Processing for Fast EV Charging Stations," MDPI, published Feb. 7, 2023.

Shah, Suyash Sushilkumar et al., Optimized AC/DC Dual Active Bridge Converter using Monolithic SiC Bidirectional FET (BiDFET) for Solar PV Applications, published in 2021 IEEE Energy Conversion Congress and Exposition (ECCE), Oct. 2021, doi: 10.1109/ECCE47101.2021.9595533.

Shakil Ahamed Khan et al., "A New Isolated Multi-Port Converter with Multi-Directional Power Flow Capabilities for Smart Electric Vehicle Charging Stations," IEEE Transactions on Applied Superconductivity, published Jan. 27, 2019.

Subhashish Bhattacharya, "Monolithic SiC-based Bidirectional FET (BiDFET): Vehicle Electrification Opportunities," APEC, published Mar. 23, 2022.

Vishnu Mahadeva Iyer et al., "Extreme Fast Charging Station Architecture for Electric Vehicles with Partial Power Processing," North Carolina State University, published Mar. 4, 2018.

International Search Report and Written Opinion dated Feb. 27, 2026 issued by the International Application Division, Korean Intellectual Property Office as International Searching Authority in connection with International Application No. PCT/US2025/053739 (10 pages).

* cited by examiner

100

MULTIPORT TRANSFORMER ENABLED MODULAR MULTIPORT POWER CONVERSION SYSTEM

CROSS-REFERENCE TO RELATED APPLICATIONS

This application is related to and claims priority from the following US patents and patent applications: this application is a continuation-in-part of U.S. patent application Ser. No. 18/627,004, filed Apr. 4, 2024, which claims priority from and the benefit of U.S. Provisional Patent Application No. 63/458,805, filed Apr. 12, 2023. Each of the above-mentioned applications is incorporated herein by reference in its entirety.

BACKGROUND OF THE INVENTION

1. Field of the Invention

The present invention relates to power conversion systems, and more specifically to multiport, modular power conversion systems capable of connecting to multiple energy sources and/or multiple power consuming nodes simultaneously.

2. Description of the Prior Art

It is generally known in the prior art to provide AC/DC converters, DC/AC inverters, DC/DC converters and other means for connecting power sources to power consuming devices.

Prior art patent documents include the following:

U.S. Patent Publication No. 20210408937 for MMC submodules scale-up methodology for mv and hv power conversion system applications by inventors Bhattacharya, et al., filed Jun. 24, 2021 and published Dec. 30, 2021, is directed to modular multilevel converter (MMC) scale-up control methodologies which can be applied for MV and HV DC applications. In one example, an MMC includes first and second legs each with submodule (SM) groups connected in series, where each SM group includes a plurality of SMs; local group controllers that can control a corresponding SM group; and a central controller that can control output voltage of the MMC via the local group controllers. The local group controllers can provide capacitor voltage balancing (CVB) control of corresponding SM groups.

WIPO Publication No. 2022103858 for Multiport energy routing systems by inventors Mauger, et al., filed Nov. 10, 2021 and published May 19, 2022, is directed to a flexible multiport energy routing system including a first port configured to connect to an AC grid, a plurality of second ports configured to connect to a plurality of devices, a step-down transformer, a power converter stack, and a third port. The step-down transformer can have a high voltage side electrically coupled to the first port and a low voltage side. The power converter stack can comprise a plurality of power converter modules each having a first converter bridge connected to the low voltage side of the step-down transformer and a second converter bridge connected to one or more of the plurality of second ports. Each of the power converter modules can have a converter transformer connected between the first and second converter bridges. The first and second converter bridges can bidirectionally manage AC and DC power flows between the first, second, and third ports.

U.S. Pat. No. 11,196,338 for Semiconductor topologies and devices for soft starting and active fault protection of power converters by inventors Beddingfield, et al., filed Dec. 29, 2018 and issued Dec. 7, 2021, is directed to semiconductor topologies and devices that can be used for soft starting and active fault protection of power converters. In one example, an active switch device includes an active switch having a gating control input; and a thyristor having a gating control input. The thyristor is coupled in parallel with the active switch. The active switch can be an IGBT, MOSFET, or other appropriate device. In another example, a power converter can include the active switch devices and switching control circuitry coupled to gating control inputs of the active switch devices.

U.S. Patent Publication No. 20210012944 for Transformer designs for very high isolation with high coupling by inventors Beddingfield, et al., filed Jul. 8, 2020 and published Jan. 14, 2021, is directed to transformer designs that offer very high isolation while maintaining high coupling between the windings. In one example, an isolation transformer includes a first excitation coil wound around a first core and a second excitation coil wound about a second core. The second core is electrically separated from the first core by a high resistivity magnetic material or a non-conductive material. The first and second cores can include corresponding core segments arranged in a trident geometry or a quindent geometry. The core segments can align when the first excitation coil is inserted into a void of the second excitation coil. The isolation transformer designs are mechanically separable which can result in safe, energized, plug operations.

U.S. Pat. No. 10,734,914 for Fault-tolerant controller for modular multi-level converters by inventors Azidehak, et al., filed Sep. 26, 2019 and issued Aug. 4, 2020, is directed to fault-tolerant controller architectures for multi-level converters. In one example, a multi-level converter includes an array of power modules. The power modules can include a controller communicatively coupled to controllers of adjacent power modules in the array of power modules. Circuitry of the controllers can receive operational data from the adjacent power modules; identify a fault condition in an adjacent power module using the operational data; and initiate reconfiguration of the array of power modules in response to an indication of the fault condition, where the reconfiguration bypasses the adjacent power module. In another example, a method includes identifying a fault condition in an adjacent power module in an array of power modules based upon operational data from one or more adjacent power modules of the array; and initiating reconfiguration of the array of power modules in response to an indication of the fault condition.

U.S. Patent Publication No. 20220199302 for Transformer and Method of Engineering a Transformer to Incorporate a Leakage Inductance by inventors Beddingfield, et al., filed Apr. 20, 2020 and published Jun. 23, 2022, is directed to a transformer including a core formed of at least one MANC alloy. The MANC alloy has a predefined permeability.

U.S. Pat. No. 11,063,579 for Circuit for providing variable waveform excitation by inventors Beddingfield, et al., filed Nov. 8, 2018 and issued Jul. 13, 2021, is directed to a circuit for testing an electronic component, such as a transformer, including at least two power supplies and at least two H bridge circuits. A first H bridge circuit is conductively coupled in parallel to a first power supply. A second H bridge circuit is conductively coupled in parallel to a second power supply. The second H bridge circuit includes one or more anti-series diodes for preventing current from the first power supply from passing through the second H bridge circuit to the second power supply. The first H bridge circuit and the second H bridge circuit are configured to conductively couple to the electronic component for providing a voltage with a predefined waveform to the electronic component.

U.S. Pat. No. 10,522,306 for System and method of causing a zero-current crossing in an electrical circuit by inventors White, et al., filed May 26, 2017 and issued Dec. 31, 2019, is directed to methods and systems for causing a zero-current crossing in an electrical circuit. The circuit can be a DC circuit in which case a switch is caused to open at or nearly at the zero crossing. Alternatively, the circuit can be an AC circuit.

U.S. Patent Pub. No. 2023/0396065 for Multi-port ac power grid flexible interconnection device and control method and system thereof by inventors Zhang, et al., filed Oct. 26, 2023 and published Dec. 7, 2023, is directed to a multi-port flexible AC interconnection device with active power flow control capability for an AC power grid, including a static synchronous compensator and a multi-port flexible interconnection module connected in series. The multi-port flexible interconnection module includes multiple voltage-source single-phase inverters sharing a DC bus, and each port is connected to a different AC power grid feeder line. By adjusting the amplitude and phase of the AC output voltage of the single-phase inverters connected in series on the feeder line, flexible interaction of active power between the feeder lines is realized, and decoupled control of active and reactive power on the feeder lines is achieved. By introducing the multi-port flexible interconnection module, the invention provides multiple controllable AC ports connected to multiple feeder lines, realizing flexible interconnection between the feeder lines, i.e., flexible interaction of active power between the feeder lines and achieving active control of power flow between the feeder lines, which can realize a flexible AC power grid with multi-port interconnection while providing corresponding reactive power to each feeder line.

U.S. Patent Pub. No. 2023/0387780 for Cascaded multi-port converter and three-phase medium-voltage input system by inventors Zhuang, et al., filed Mar. 30, 2023 and published Nov. 30, 2023, is directed to a cascaded multi-port converter and a three-phase medium-voltage input system. Input terminals of the module units are cascaded. In each module unit: input ends of the high-voltage conversion units are cascaded, a magnetic core of a multi-winding transformer is wound with multiple primary windings and at least one secondary winding, an output end of each high-voltage conversion unit is connected to a corresponding primary winding, and the secondary winding is connected to an input end of a corresponding low-voltage rectifying unit. Therefore, the windings of the multiple high-voltage conversion units share the magnetic core, and the number of the multi-winding transformers and the number of the low-voltage rectifying units can be reduced, thereby reducing the volume, weight, and costs of the cascaded multi-port converter.

U.S. Pat. No. 11,557,957 for Configurable power module for AC and DC applications by inventors Abolhassani, et al., filed Aug. 4, 2021 and issued Jan. 17, 2023, is directed to an embodiment, a power module may include: a plurality of first stages, each having an H-bridge to receive an incoming AC voltage at a first frequency and rectify the incoming AC voltage to a DC voltage; a plurality of DC buses, each to receive the DC voltage from one of the plurality of first stages; a plurality of second stages, each coupled to one of the plurality of DC buses to receive the DC voltage and output a second AC voltage at a second frequency; and a hardware configuration system having fixed components and optional components to provide different configurations for the power module.

WIPO Publication No. 2022216738 for Modular multi-port AC battery power converter systems and methods of using same by inventors Mauger, et al., filed Apr. 5, 2022 and published Oct. 13, 2022, is directed to a power conversion system including a first battery module, a second battery module, first and second transformers, and first, second, and third current source converter bridges. The transformers can have low voltage sides and high voltage sides. The first bridge can be configured to connect the battery modules and the low voltage sides of the transformers. A mid-point of the serial connection of the battery modules can be connected to a mid-point of the series connection of the transformers. The second bridge can connect to the high voltage side of the first transformer and one or more ports configured to transmit electrical power to and/or receive electrical power from an electrical load and/or source. The third bridge can be configured to connect to the high voltage side of the second transformer and the one and one or more ports.

WIPO Publication No. 2022173791 for Unified control strategies for grid-connected converters by inventors Miranbeigi, et al., filed Feb. 9, 2022 and published Aug. 18, 2022, is directed to a universal control (UniCon) scheme for grid-connected converters that allows operation automatically in grid-following, grid-firming, and grid-forming modes. The converter does not need information on the grid or connected sources and loads. The converter can set its own operating point based on local measurements. The converter can operate over a wide range of typically encountered steady-state, transient, and fault conditions. UniCon realizes a universal control strategy for converters on the grid, allowing operation in distinct modes, including dispatch in grid connected mode, and automatic load sharing in islanded or microgrid mode. Under transient conditions, the converters provide inertial support and improve damping to stabilize and reduce disturbances. Multiple converters on the system do not require detailed system knowledge or low-latency communications for fast coordination, using communications when available for slow coordination and system level optimization.

WIPO Publication No. 2023288248 for Soft switching solid state transformers implementing voltage stress mitigation techniques by inventors Zheng, et al., filed Jul. 13, 2022 and published Jan. 19, 2023, is directed to a soft-switching solid-state power transformer including a transformer, first and second auxiliary resonant circuits, first and second current-source inverter (CSI) bridges, and a first transformer capacitor. The first auxiliary resonant circuit can be coupled to a first winding connection of the transformer. The first auxiliary resonant circuit can comprise a resonant capacitor coupled across the first winding connection, and a resonant inductor coupled across the first winding connection in parallel with the resonant capacitor. The first CSI bridge can be coupled to the first auxiliary resonant circuit. The second auxiliary resonant circuit can be coupled to the second winding connection of the transformer. The second CSI bridge can be coupled to the second auxiliary resonant circuit. The first transformer capacitor can be coupled to a high voltage side of the first winding connection and a ground.

WIPO Publication No. 2022046959 for Energy meters and energy monitoring systems and methods by inventors Kulkarni, et al., filed Aug. 26, 2021 and published Mar. 3, 2022, is directed to an energy meter including a current sensor and an interchangeable voltage sensor. The current sensor can be configured to measure an electrical current flowing through a conductor. The interchangeable voltage sensor detachably can be connected to the current sensor and configured to measure an electrical voltage carried by the conductor.

WIPO Publication No. 2022173800 for Power converters utilizing deep learning neural networks and methods of use by inventors Miranbeigi, et al., filed Feb. 9, 2022 and published Aug. 18, 2022, is directed to a power converter system comprising a power converter. The power converter system can include a power converter electrically connected to a local power supply and an electrical utility grid. The power converter can include an output configured to exchange electrical power with the electrical utility grid. The power converter can be further configured to monitor one or more electrical parameters of the electrical utility grid over a period of time and alter one or more electrical parameters of the output of the power converter based on the monitored one or more electrical parameters of the electrical utility grid in real time using a deep learning neural network.

SUMMARY OF THE INVENTION

The present invention relates to power conversion systems, and more specifically to multiport, modular power conversion systems capable of connecting to multiple energy sources and/or multiple power consuming nodes simultaneously.

It is an object of this invention to provide a system of easily modifiable and electrically isolated ports in a power conversion system for selectively charging and/or discharging individual energy sources and sinks within an electric power grid.

In one embodiment, the present invention is directed to a modular multiport power system, including a central transformer, a plurality of galvanically isolated ports inductively coupled to the central transformer via windings, one or more voltage sensors and/or one or more current sensors for each of the plurality of galvanically isolated ports configured to detect the voltage and/or current characteristics of each of the plurality of galvanically isolated ports, and at least one controller operable to selectively isolate one or more of the plurality of galvanically isolated ports, wherein each of the plurality of galvanically isolated ports are connected to one or more sources and/or loads, wherein each of the plurality of galvanically isolated ports includes a plurality of metal-oxide semiconductor field effect transistors (MOSFET) in an AC switch or H-bridge configuration, and wherein the at least one controller is operable to stop MOSFET switching by the plurality of MOSFETs on one or more of the plurality of galvanically isolated ports in response to the voltage and/or current characteristics detected by the one or more voltage sensors and/or the one or more current sensors.

For all types of ports, whether they are AC ports or DC ports, there is a transformer and there is a plus connection and a minus connection, providing a minimum of two connections. Each connection point has a decoupling impedance associated with it, with the impedance being an inductor, a capacitor, a resister, or any combination thereof, referred to as a decoupling network. Each decoupling network is connected to a connection point (e.g., the plus connection, the minus connection, etc.) is one half of the total decoupling impedance. Careful selection of the decoupling impedance allows for power flow across the terminals at different frequencies. It also allows for high frequency decoupling of signals and noise from different terminals to other terminals through parasitic inter-winding capacitance of the transformers. Alternatively, the parasitic impedance of the transformer is able to be inductive, inductive-capacitive, and even inductive-capacitive with multiple inductors (Ls) and capacitors (Cs) (or even resistors (Rs)) dominant at different frequencies. Careful selection of the decoupling impedance also allows for careful coupling of different factors of the low frequency and high frequency signals from one port to another port given the decoupling impedance design versus the transformer impedance design. Furthermore, the careful selection of the decoupling impedance also ensures stability of machine operation in multiple modes across all ports under input and output voltage variations. At all levels, the system is able to match the decoupling impedances to the transformer impedance curves as reflected from a first port to a second port, or as reflected from the second port to the first port. The decoupling impedances are the same from winding one to winding two (from winding 1 to winding n) or are different (from winding 1 to winding n). Decoupling impedances are switched for different transfer characteristics for different sources and loads. Furthermore, the system is able to convey power or to convey communications, or to convey both using various decoupling impedance characteristics.

In another embodiment, the present invention is directed to a modular multiport power system, including a central transformer, a plurality of galvanically isolated ports inductively coupled to the central transformer via windings, one or more voltage sensors and/or one or more current sensors for each of the plurality of galvanically isolated ports configured to detect the voltage and/or current characteristics of each of the plurality of galvanically isolated ports, and at least one controller, including an artificial intelligence module, operable to selectively manipulate one or more of the plurality of galvanically isolated ports, wherein each of the plurality of galvanically isolated ports are connected to one or more sources and/or loads, each of the plurality of galvanically isolated ports connected to the central transformer with one or more impedance components, wherein the at least one controller receives instructions to control a percentage of power drawn by or supplied from one of the plurality of galvanically isolated ports, and wherein at least one controller is operable to adjust an impedance for the one or more impedance components, for at least one of the plurality of galvanically isolated ports to achieve meet the percentage of power drawn by or supplied from the one of the plurality of galvanically isolated ports.

In yet another embodiment, the present invention is directed to a method of transferring power from source nodes to load nodes, including providing a central transformer, connecting a plurality of sources and/or loads to the central transformer via a plurality of galvanically isolated ports, wherein each of the plurality of galvanically isolated ports include one or more voltage sensors and/or one or more current sensors for each of the plurality of galvanically isolated ports configured to detect the voltage and/or current characteristics of each of the plurality of galvanically isolated ports and a plurality of metal-oxide semiconductor field effect transistors (MOSFET) in an AC switch or H-bridge configuration, the one or more voltage sensors and/or the one or more current sensors transmitting data regarding the voltage and/or current characteristics of each of the plurality of galvanically isolated ports to at least one controller, and the at least one controller stopping MOSFET switching by the plurality of MOSFETs on one or more of the plurality of galvanically isolated ports in response to the voltage and/or current characteristics detected by the one or more voltage sensors and/or the one or more current sensors.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 2 E is a first part of yet another circuit diagram of two ports on the four-port multiport converter according to one embodiment of the present invention.

DETAILED DESCRIPTION

Figure 1:
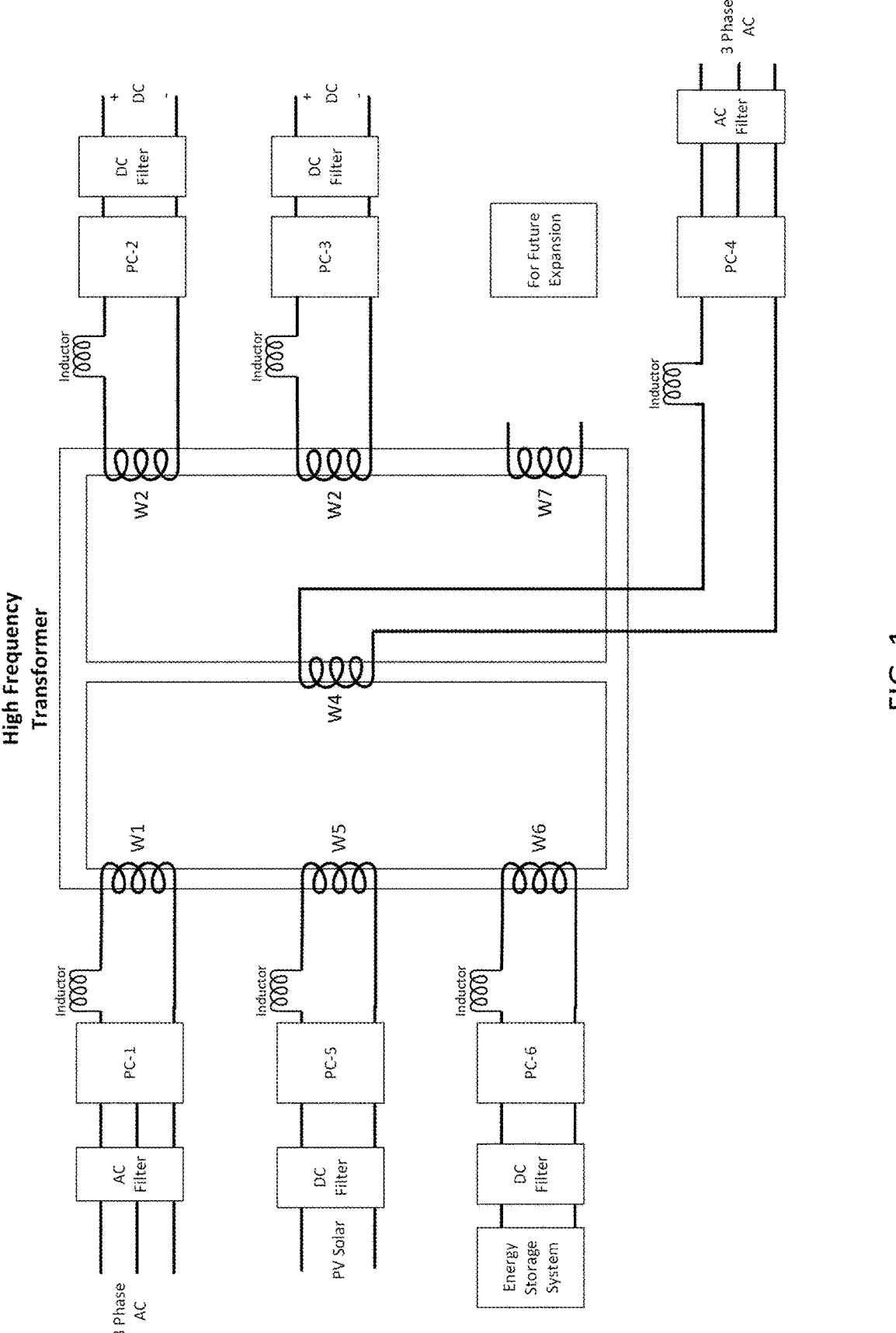
FIG. 1 is a circuit diagram of a modular, multiport power conversion system including seven ports according to one embodiment of the present invention.

The present invention is generally directed to power conversion systems, and more specifically to multiport, modular power conversion systems capable of connecting to multiple energy sources and/or multiple power consuming nodes simultaneously.

In one embodiment, the present invention is directed to a modular multiport power system, including a central transformer, a plurality of galvanically isolated ports coupled via inductive, capacitive, resistive, or any other suitable hybrid coupling methods to the central transformer via windings, one or more voltage sensors and/or one or more current sensors for each of the plurality of galvanically isolated ports configured to detect the voltage and/or current characteristics of each of the plurality of galvanically isolated ports, and at least one controller operable to selectively isolate one or more of the plurality of galvanically isolated ports, wherein each of the plurality of galvanically isolated ports are connected to one or more sources and/or loads, wherein each of the plurality of galvanically isolated ports includes a plurality of metal-oxide semiconductor field effect transistors (MOSFET) in an AC switch or H-bridge configuration, and wherein the at least one controller is operable to stop MOSFET switching by the plurality of MOSFETs on one or more of the plurality of galvanically isolated ports in response to the voltage and/or current characteristics detected by the one or more voltage sensors and/or the one or more current sensors.

In another embodiment, the present invention is directed to a modular multiport power system, including a central transformer, a plurality of galvanically isolated ports inductively coupled to the central transformer via windings, one or more voltage sensors and/or one or more current sensors for each of the plurality of galvanically isolated ports configured to detect the voltage and/or current characteristics of each of the plurality of galvanically isolated ports, and at least one controller, including an artificial intelligence module, operable to selectively manipulate one or more of the plurality of galvanically isolated ports, wherein each of the plurality of galvanically isolated ports are connected to one or more sources and/or loads, each of the plurality of galvanically isolated ports connected to the central transformer with one or more impedance components, wherein the at least one controller receives instructions to control a percentage of power drawn by or supplied from one of the plurality of galvanically isolated ports, and wherein the at least one controller is operable to adjust on-off duty cycles and/or phasing of the on-off duty cycles with respect to other ports, for at least one of the plurality of galvanically isolated ports to achieve meet the percentage of power drawn by or supplied from the one of the plurality of galvanically isolated ports.

In yet another embodiment, the present invention is directed to a method of transferring power from source nodes to load nodes, including providing a central transformer, connecting a plurality of sources and/or loads to the central transformer via a plurality of galvanically isolated ports, wherein each of the plurality of galvanically isolated ports include one or more voltage sensors and/or one or more current sensors for each of the plurality of galvanically isolated ports configured to detect the voltage and/or current characteristics of each of the plurality of galvanically isolated ports and a plurality of metal-oxide semiconductor field effect transistors (MOSFET) in an AC switch or H-bridge configuration, the one or more voltage sensors and/or the one or more current sensors transmitting data regarding the voltage and/or current characteristics of each of the plurality of galvanically isolated ports to at least one controller, and the at least one controller stopping MOSFET switching by the plurality of MOSFETs on one or more of the plurality of galvanically isolated ports in response to the voltage and/or current characteristics detected by the one or more voltage sensors and/or the one or more current sensors.

Energy demand is increasing, with increases in sales of devices such as electric vehicles signaling a need to stabilize and scale the grid. Needs for supplying power to the electric power grid are multivariate, including needs for more efficient energy generation, energy storage, and energy distribution. One issue with energy distribution is the expanding physical footprint of the grid infrastructure used to coordinate and deliver power to specific sources. Additionally, scalability of existing infrastructure poses challenges as well. With existing systems, if new components need to be added to a grid, critical portions of grid infrastructure, such as power conversion systems, need to be taken offline or replaced entirely. This is both inconvenient and often impractical, as downtime of the grid often has devastating consequences. For this reason, rather than expanding existing infrastructure, grid designers often need to create new elements of the grid, including new power conversion systems, expanding the physical blueprint taken up by these devices.

Existing systems need new reliable methods of scaling grid conversion systems, such that new sources and power consuming loads are able to be added or dropped at will. Furthermore, improvements need to increase the spatial efficiency of power conversion systems, preferably allowing multiple distributed energy sources to be converted at a single location and provided to a plurality of sources either at the same location or in different locations, the latter also being made possible by enhanced grid-support services such as demand response or "virtual power plant". Because electric vehicles are able to act as sources of power and other distributed energy sources, including solar panels, are becoming more popular, the integration of a distributed energy system is likely to become more critical in the future. Finally, for systems incorporating multiple energy sources and sinks at a single location, methods for isolating individual connected devices need to be provided, to avoid risk of contamination of the larger grid from failure of a single device.

Referring now to the drawings in general, the illustrations are for the purpose of describing one or more preferred embodiments of the invention and are not intended to limit the invention thereto.

FIG. 1 is a circuit diagram of a modular, multiport power conversion system including seven ports according to one embodiment of the present invention. The present invention includes a modular, multiport power conversion system (MM-PCS). The PCS includes a central transformer with a plurality of ports that form an integral part of the PCS. The ports are able to include both alternating current (AC) and direct current (DC) ports as either sources or sinks for power, allowing various power sources to be used to charge attached components. DC ports are able to have either positive or negative polarity, or split 3-wire ports with positive, zero, and negative voltage polarities. Furthermore, AC ports included in the PCS include single phase or three-phase AC ports. This is particularly useful for integrating a plurality of distributed energy resources and distributed energy storage systems for connecting those resources to various power consuming loads via a single PCS unit. This forms a sort of "matrix" of both sinks and sources that are able to be controlled simultaneously. The matrix is able to provide power transfer between any two (or more) of the ports, while able to isolate other ports, such that the system is able to selectively draw power from or transfer power to connected devices. The PCS is able to provide power simultaneously from a plurality of sources to a single power consuming load, or for multiple power consuming loads to draw power from a single power source simultaneously. In one embodiment, types of power sources able to be connected to the PCS include, but are not limited to, at least one battery, at least one solar cell, at least one wind turbine, at least one power plant, at least one microgrid, at least one steam turbine, at least one electric vehicle, and/or any other form of power supplying or power storage device. In one embodiment, the PCS is operable to interface with renewable and non-renewable energy sources including solar PV, wind turbines, fuel cells, hydrogen systems, flywheels, capacitors, diesel gensets, natural gas generators, and any future energy technologies.

The number of ports of the PCS is equivalent to the number of windings around the central transformer, with more windings providing possibilities for more energy sources or energy storage devices to connect to the system. In one embodiment, the PCS includes at least three, at least five, at least seven, at least nine, at least twenty, at least fifty, and/or any other number of windings, and therefore any number of corresponding ports. One of ordinary skill in the art will understand that the number of primary windings (i.e., windings that draw power from a source) and the number of secondary windings (i.e., windings that deliver power to a load) are not intended to be limited according to the present invention. Ports are able to be added or removed over time by adding (or enabling) or removing (or disabling) windings to the transformer, allowing for, by way of example and not limitation, a three-port PCS to later be used for a seven-port application, greatly improving scalability of the system. Instead of being thought of as being limited to a specific number of ports or connected devices, the scalability of the central PCS is only really limited by the volt-ampere (VA) rating of the central transformer. In one embodiment, the VA rating of the central transformer is between approximately 1 VA and approximately 1000 MVA. One of ordinary skill in the art will understand that the VA rating of transformers used in the present invention are not intended to be limiting and will depend on the application for which each PCS is used. It is also therefore important that, if new ports are added to the PCS at a later time, that the addition of the new ports not cause the transformer to exceed its VA rating, where that VA rating limit may also be enforced by controls logic.

In one embodiment, a first port (PC1) is a three-phase AC port, including an AC-side filter, and connected to the central transformer by a first winding (W1). In one embodiment, a second port (PC2) is a DC port including a single capacitor (C2) between the leads, and connected to the central transformer by a second winding (W2). In one embodiment, a third port (PC3) is a DC port including multiple capacitors (C3, C4) between the leads and connected to the central transformer by a third winding (W3). In one embodiment, a fourth port (PC4) is a three-phase AC port including an AC side filter and connected to the central transformer by a fourth winding (W4). In one embodiment, a fifth port (PC5) is connected to at least one solar cell and connected to the central transformer by a fifth winding (W5). In one embodiment, a sixth port (PC6) is a DC port connected to at least one energy storage system including at least one capacitor (C1) between the leads and connected to the central transformer by a sixth winding (W6). In one embodiment, a seventh winding (W7) is connected to the central transformer and is able to connect to and form a seventh node of any type.

The relative voltage across, or current supplied or drawn from the central transformer for each port, is able to be modified based on a turn ratio for the winding for each port. This allows the transformer to step up or step down the voltage and/or current from individual sources or to individual sinks as needed to address a variety of needs, allowing for a more modular configuration of the PCS. Therefore, the same PCS is capable of acting as a buck converter (i.e., stepping down voltage) between one or more sources and one or more sinks or a boost converter (i.e., stepping up voltage) depending on the needs of the specific situation. Furthermore, in one embodiment, the central transformer includes a plurality of parallel circuit paths, such that additional windings (and therefore additional ports) are able to be added in series, which will increase the voltage rating of the combined port) or in parallel, which will increase the current rating of the combined port. However, the PCS can also use current and voltage control schemes to provide buck or boost operation even with a fixed turns ratio.

The central transformer of the PCS in the present invention provides galvanic isolation between each of the ports, reducing the danger of electric shocks or current cross-over between components connected to each port. The galvanic isolation is what mainly allows for selectivity in transferring power from one specific port A in the PCS to another specific port B, even if the PCS includes more ports than simply port A and port B. In one embodiment, a controller for the PCS is able to switch between islanding and grid connected modes for the PCS. The ability to individually isolate each port also allows for the system to easily cut off and replace individual ports with new ports, either for purposes of upgrade or repair, without turning off the PCS as a whole, providing for the ability to perform "hot swaps." Furthermore, failure of an individual port does not cause failure of the entire PCS, as the failed port is able to be easily isolated and cut off from the system. In one embodiment, in the event of a faulty port, the voltage for the faulty port is dialed (or programmed) to a predetermined "touch safe" voltage (e.g., by a controller connected to the PCS system). By way of example and not limitation, in one embodiment, the touch safe voltage is equal to approximately 0 V or is less than approximately 60 V or even 28 V. In one embodiment, faults at individual ports are detected by at least one fault detection algorithm, which is used to determine when the controller should dial, or program, the port to the touch safe voltage. Active control of the voltage conditions is useful for a shutdown and disconnect procedure for individual ports, while helping to prevent arc flashes, especially for DC ports. In one embodiment, active voltage control is also used when each port is ramped up into operating condition. Connection of the windings in series or in parallel on the transformer does not eliminate the advantage of galvanic isolation for the system, allowing for high selectivity and modularity for the added ports.

In one embodiment, the at least one fault detection algorithm operates, at least in part, based on data received from current sensors (e.g., open loop, closed loop, flux-gate, etc.) measuring current into and/or out of one or more of the individual ports. In one embodiment, the at least one fault detection algorithm operates, at least in part, based on data received from voltage sensors (e.g., capacitive-type voltage sensors, resistive-type voltage sensors, etc.) measuring voltage across one or more of the individual ports. In one embodiment, for one or more of the individual ports, the at least one fault detection algorithm detects faults based on higher-than-expected input current levels (i.e., an undercurrent condition), greater-than-expected output current levels (i.e., an overcurrent condition), less-than-expected voltage levels (i.e., an undervoltage condition), greater-than-expected voltage levels (i.e., an overvoltage condition), and/or detection of an arc. In one embodiment, arc fault detection is based on detection of a known high frequency signal coupled with one or more associated voltage or current levels. In one embodiment, the fault detection algorithm is based on detecting more than one fault condition simultaneously (e.g., an overcurrent condition and an undervoltage condition). In one embodiment, whether fault conditions occur "simultaneously" is based on whether they occur and/or are detected within a preset time period. In one embodiment, the preset time period is approximately 100 microseconds.

In one embodiment, the controller includes one or more cybersecurity modules configured to detect, mitigate, or respond to cyber threats, unauthorized access, and faults, ensuring system resilience and operational continuity.

In one embodiment, each port is separately grounded, including its own ground reference, further providing for galvanic isolation. Furthermore, ports having separate grounding systems provides for improved scalability of the PCS in terms of both power and voltage output.

In one embodiment, one or more of the ports are capable of using zero-voltage switching (ZVS). ZVS is particularly useful for high-frequency applications, especially for power grid applications, as high-frequency circuits switch frequently and thus suffer more greatly from switching losses. ZVS utilizes pulse-width modification (PWM) operations to, in a first mode, delay the onset of a drain current in a switching transistor until the drain-source voltage over the transistor is zero and later, in a second mode, slows or delays the rate of increase of the drain-source voltage while the drain current drops to zero. This greatly decreases the overlap between drain current and drain-source voltage, thereby decreasing parasitic or switching power loss in the circuit, decreasing noise, and increasing the efficiency of the system. ZVS is especially beneficial in transformer-related applications, as it decreases transformer inductance loss as well. In one embodiment, the ZVS is achieved through inclusion of at least one resonant circuit between the source voltage connected to each port and the corresponding winding connected to the transformer for each port. In one embodiment, the switch includes at least one metal-oxide semiconductor field effect transistor (MOSFET) and/or at least one insulated-gate bipolar transistor (IGBT). In one embodiment, the switch includes at least one MOSFET, IGBT, gallium nitride (GaN), silicon carbide (SiC) device, and/or any other suitable semiconductor technology.

In one embodiment, one or more of the ports are capable of using zero-current switching (ZCS). ZCS is, similarly to ZVS, very beneficial for high frequency applications. ZCS is similar to ZVS except that, in the first mode, it slows or delays the rate of increase of the drain current, and, in the second mode, it delays the increase of the drain-source voltage until the drain current drops to zero. Similarly to ZVS, in one embodiment, the ZCS is achieved through inclusion of at least one resonant circuit between the source voltage connected to each port and the corresponding winding connected to the transformer for each port. In one embodiment, the switch includes at least one metal-oxide semiconductor field effect transistor (MOSFET) and/or at least one insulated-gate bipolar transistor (IGBT).

The magnetizing inductance of the transformer demonstrates a lagging current that is able to be designed as a specific fixed percentage of the full load rated current of the transformer. During light load current conditions, the magnetizing current essentially provides negative, or lagging, current during a switch voltage transition for the power converter. The negative, or lagging, current enables the system to discharge the device capacitance of the switches being turned on, which provides the zero voltage switching for the switch being turned on. Additionally, the negative, or lagging, magnetizing current enables charging the capacitor for the switch being turned off. With this system, a bulkier resonant circuit is not required.

Figure 2A:
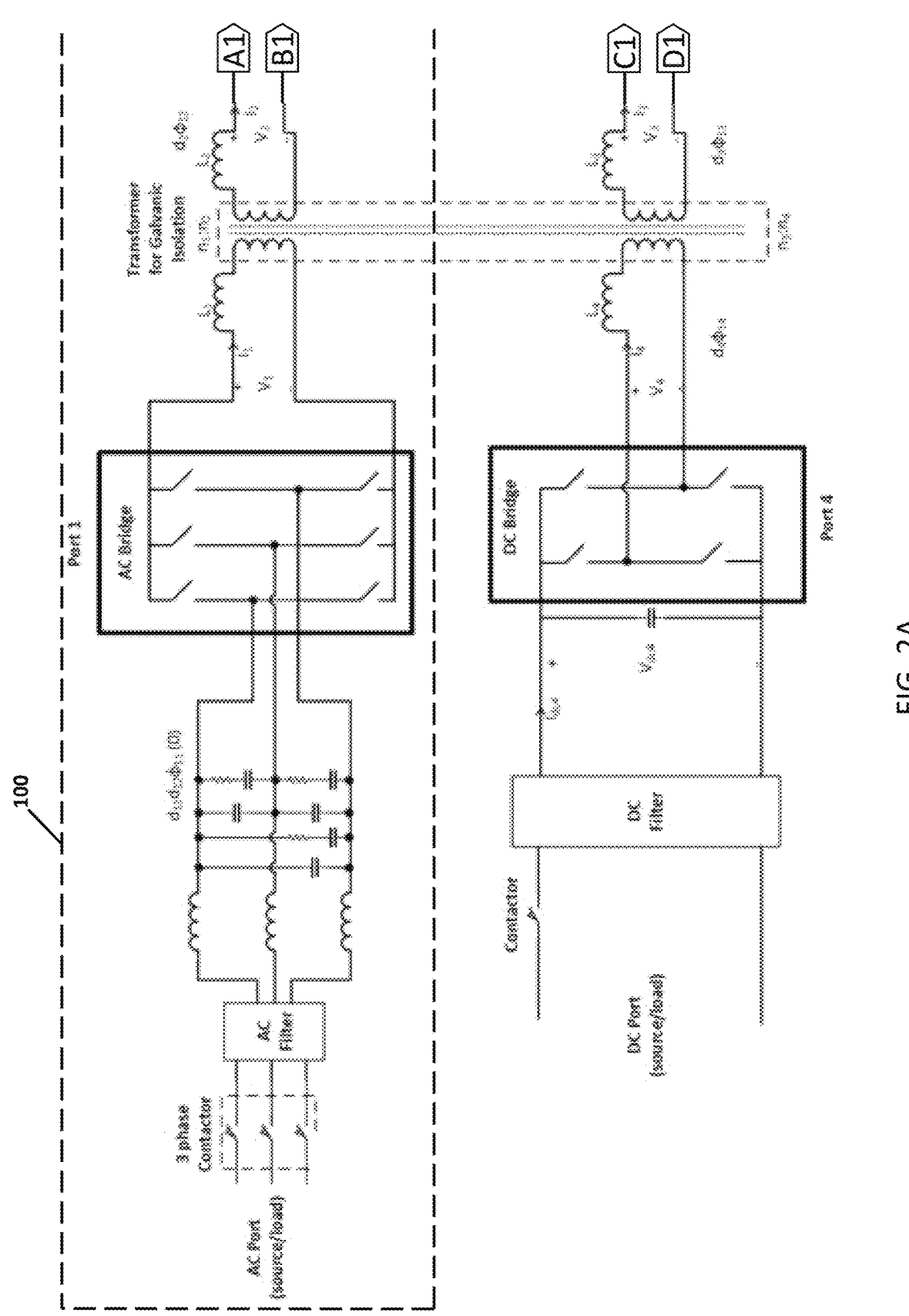
FIG. 2A is a first part of a circuit diagram of a four-port multiport converter architecture according to one embodiment of the present invention.
Figure 2B:
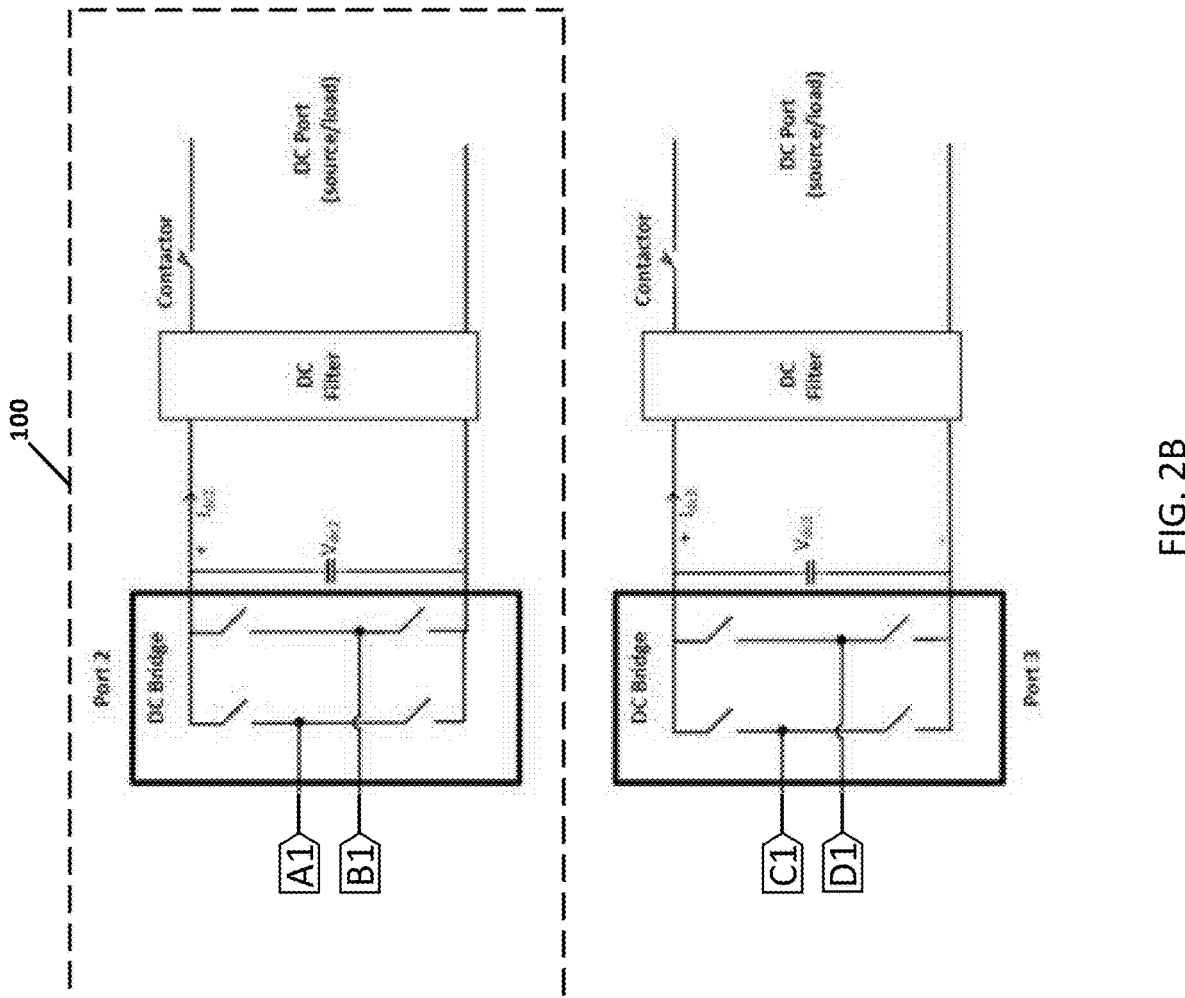
FIG. 2B is a second part of a circuit diagram of a four-port multiport converter architecture related to the first part of the circuit diagram shown in FIG. 2A.
Figure 2C:
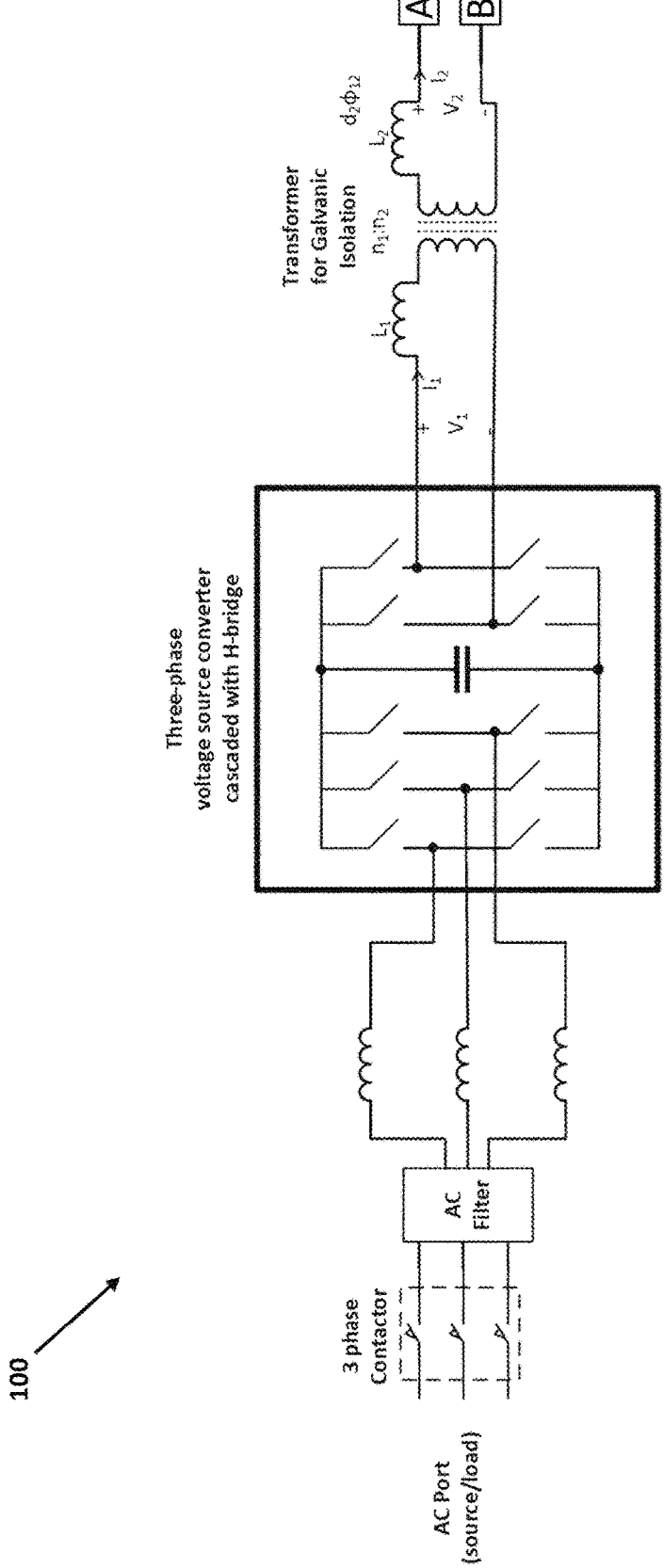
FIG. 2 C is a first part of a circuit diagram of two ports on the four-port multiport converter according to one embodiment of the present invention.
FIG. 2D is a second part of a circuit diagram of two ports on the four-port multiport converter related to the first part of the circuit diagram shown in FIG. 2C.
FIG. 2F is a second part of yet another circuit diagram of two ports on the four-port multiport converter related to the first part of the circuit diagram shown in FIG. 2E.
Figure 2D:
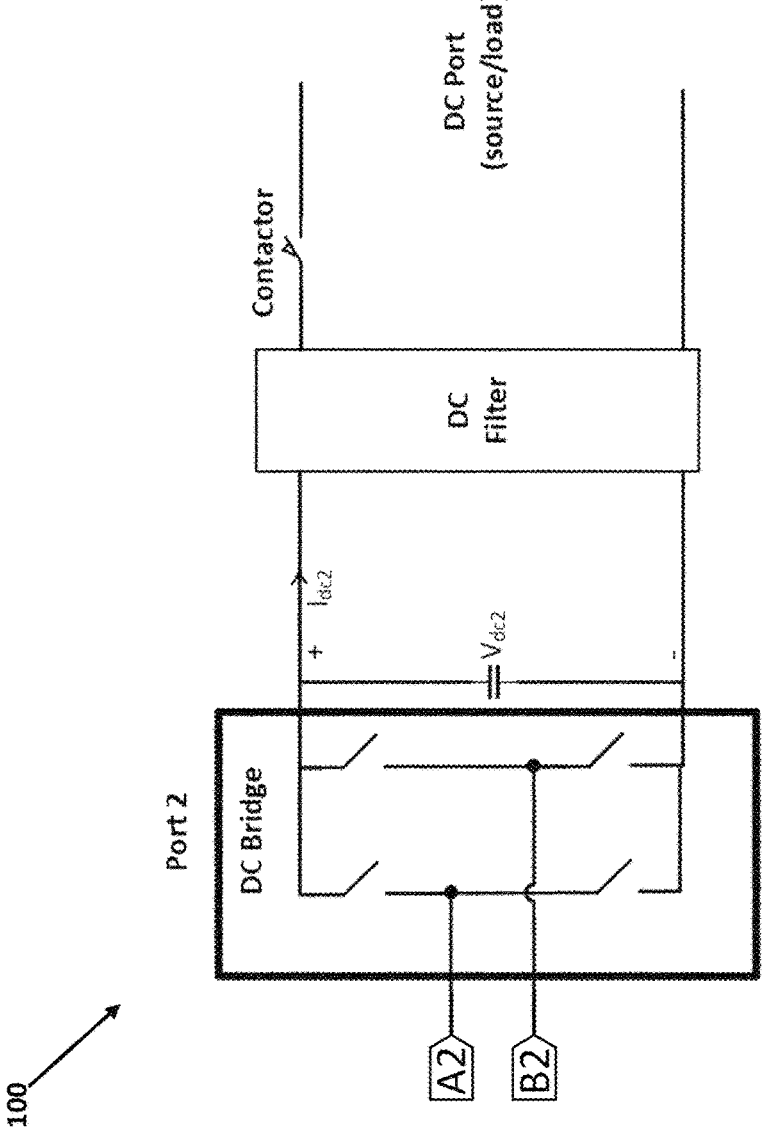

FIGS. 2A-B comprise a circuit diagram of a four-port multiport converter architecture, including two ports 100, according to one embodiment of the present invention. One of ordinary skill in the art will understand that while a four-port architecture is depicted in FIGS. 2A-B, alternative embodiments including various other numbers of ports are also contemplated herein, as the architecture is scalable to greater than four ports by increasing the capability of the central transformer and connecting more limbs to it. The architecture shown is modular, allowing added ports to be AC three-phase without neutral, AC three-phase with neutral, AC single phase, or DC, depending on the type of application. In FIGS. 2A-B, a version is depicted with one AC three-phase without neutral port and three DC ports. However, an AC three phase with neutral is also able to be incorporated into the same multiport architecture. In one embodiment, the architecture includes inductors to assist in power transfer. In one embodiment, MOSFETs are included in universal configurations (e.g., back-to-back switches, also called AC switches) for either AC or DC ports, and H-bridge configurations, which are only used for DC ports. In one embodiment, one or more filters are included, with different configurations depending on AC or DC applications. Contactors are also included with three-phase AC, single-phase AC, or DC. One of ordinary skill in the art will understand that other protection elements, such as surge protectors or ground-fault detectors/interrupters or fuses are also able to be included, though are not shown in FIGS. 2A-B.

FIGS. 2 C-D comprise an alternative circuit diagram of two ports 100 on the four-port multiport converter illustrated in FIGS. 2A-B. The circuit diagram of two ports 100 is an alternative multiport converter configuration using a dual active bridge (DAB) topology. The circuit diagram of two ports 100 depicts a voltage source converter cascaded with an H-bridge. In one embodiment, one or more filters are included, with different configurations depending on AC or DC applications. The one or more filters include differential-mode, common-mode, and/or other single-stage or multi-stage filter implementations.

Figure 2E:
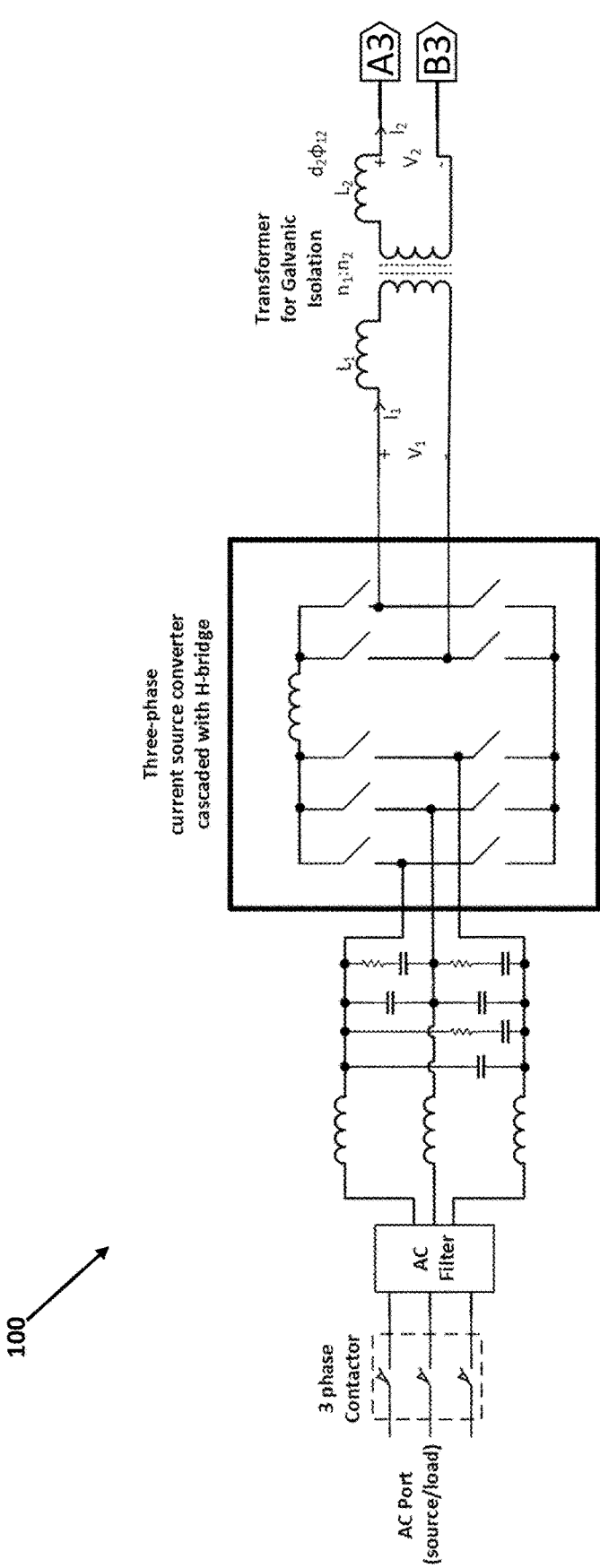
Figure 2F:
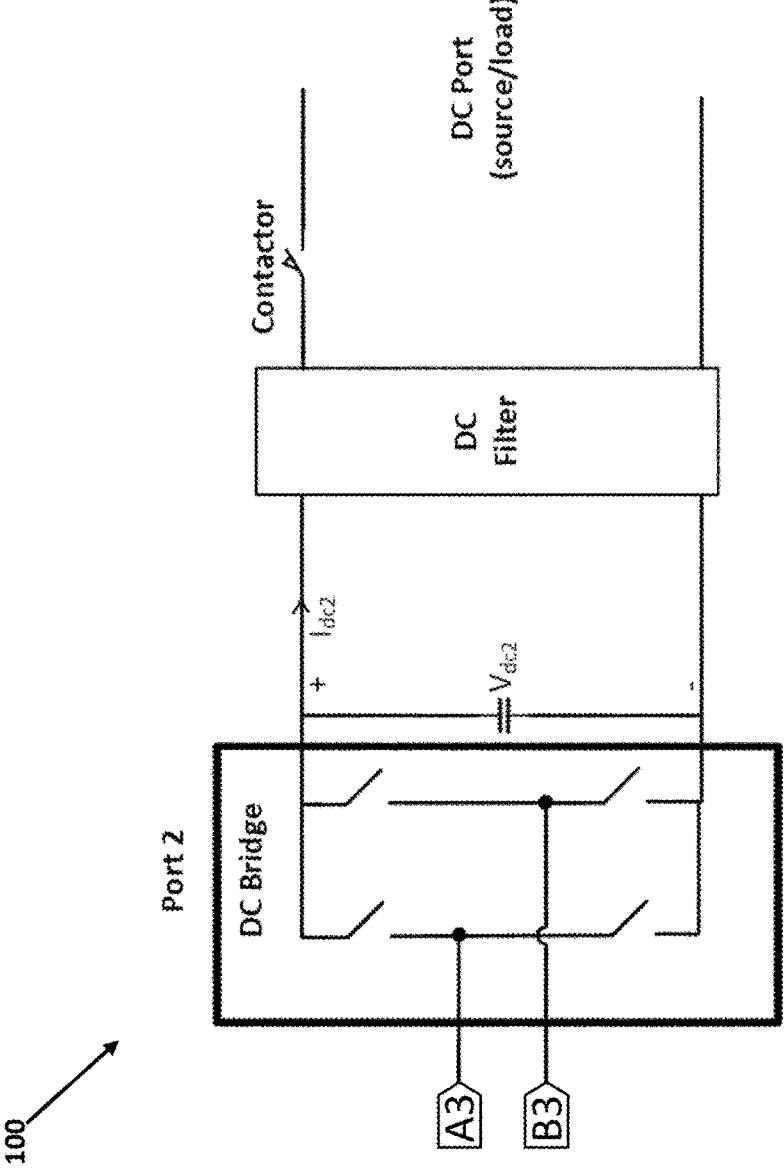

FIGS. 2E-F comprise another circuit diagram of two ports 100 on the four-port multiport converter illustrated in FIGS. 2A-B. The circuit diagram of two ports 100 depicts a current source converter cascaded with an H-bridge. In one embodiment, one or more filters are included, with different configurations depending on AC or DC applications. The one or more filters include differential-mode, common-mode, and/or other single-stage or multi-stage filter implementations.

For all types of ports, whether they are AC ports or DC ports, there is a transformer and there is a plus connection and a minus connection, providing a minimum of two connections. Each connection point has a decoupling impedance associated with it, with the impedance being an inductor, a capacitor, a resister, or any combination thereof, referred to as a decoupling network. Each decoupling network is connected to a connection point (e.g., the plus connection, the minus connection, etc.) is one half of the total decoupling impedance. Careful selection of the decoupling impedance allows for power flow across the terminals at different frequencies. It also allows for high frequency decoupling of signals and noise from different terminals to other terminals through parasitic inter-winding capacitance of the transformers. Alternatively, the parasitic impedance of the transformer is able to be inductive, inductive-capacitive, and even inductive-capacitive with multiple inductors (Ls) and capacitors (Cs) (or even resistors (Rs)) dominant at different frequencies. Careful selection of the decoupling impedance also allows for careful coupling of different factors of the low frequency and high frequency signals from one port to another port given the decoupling impedance design versus the transformer impedance design. Furthermore, the careful selection of the decoupling impedance also ensures stability of machine operation in multiple modes across all ports under input and output voltage variations. At all levels, the system is able to match the decoupling impedances to the transformer impedance curves as reflected from a first port to a second port, or as reflected from the second port to the first port. The decoupling impedances are the same from winding one to winding two (from winding 1 to winding n) or are different (from winding 1 to winding n). Decoupling impedances are switched for different transfer characteristics for different sources and loads. Furthermore, the system is able to convey power or to convey communications, or to convey both using various decoupling impedance characteristics.

Advantageously, a fault on any one port in the system only leads to that port alone becoming unavailable, with the remaining ports continuing to function as is. The central transformer provides galvanic isolation from one port to the rest, hence enabling continued, uninterrupted operation, which also provides safety. Each port has a dedicated set of contactors to isolate the port from the source or load to which it is connected. Firmware used for the modular multiport system implements a defined state machine to periodically check for faults, as part of major transitions, and the firmware follows a predefined set of procedures to isolate the faulty port from the rest of the system.

Faults on ports in the system are able to be broadly categorized into one of the following types discussed below. First, instantaneous overvoltage or overcurrent is able to be detected within a few microseconds by observing the transformer voltages and currents. For overvoltage, the port is immediately isolated by stopping MOSFET switching. For overcurrent, the transistors are repeatedly turned off and on to first supply inrush current to a connected load, and if the fault persists, to clear a fuse or breaker. If the overcurrent persists given the limits of the $i^2t$ curve of the machine, the port is then isolated by stopping MOSFET switching to prevent damage to the machine and to resume operation of all other valid ports. In the case of instantaneous overvoltage or overcurrent, the port is connected after opening contactors and the port is marked as unavailable on a user interface for the modular multiport system.

A second type of fault occurs when one or more MOSFETs fails to open. This is able to be detected within a few microseconds by observing the gate driver faults as well as transformer voltages and currents. The port is then immediately isolated by stopping MOSFET switching, with the port being disconnected after opening contactors and marked as unavailable on a user interface for the modular multiport system.

A third type of fault occurs when one or more MOSFETs fails to close. This is able to be detected within a few microseconds by observing the gate driver faults as well as the transformer voltages and currents. The ports are then immediately isolated by stopping MOSFET switching if there is a universal port configuration, with the ports being disconnected after opening contactors and marked as unavailable on a user interface for the modular multiport system.

A fourth type of fault is a contactor weld, which is able to be detected as part of the state machine either during startup or after there is a need to disconnect the port manually or automatically, as part of the requirements of the application. The port is then able to be isolated immediately by stopping MOSFET switching (in a universal port configuration) and then port is marked as unavailable on a user interface for the modular multiport system.

A fifth type of fault is a ground isolation fault. In some applications, periodic checking is performed for isolation of the ports with the ground. Preferably, the periodic isolation tests are performed as part of the state machine before commencing power flow, or even during power flow. If the isolation test marginally fails with a warning, the port is ramped down in voltage and current, the contactor is opened, and the port is marked as unavailable on a user interface for the modular multiport system. If the isolation test fails with an error, the power flow to that port is immediately interrupted by stopping MOSFET switching, the contactor is opened, and the port is marked as unavailable on a user interface for the modular multiport system.

For any type of port failure, if it was previously actively sourcing or consuming power, an automatic power flow adjustment is made on other ports without the need for human intervention. If a source port is faulted, other sources increase their power levels to compensate. If the other sources reach capacity, then the power supplied to connected loads is throttled with appropriate indications on a user interface for the modular multiport system. The system is able to receive a user setting of a certain priority to certain loads such that high priority loads stay on while lower priority loads are disconnected. In the event that is only a single source port, which is faulted, power transfer is ceased and the machine is stopped. An additional source port is able to be engaged if it is connected, in which case the converter will transition to the other source port and attempt to provide the entire load demand from that source. The load power potentially needs to be throttled down, however, depending on the time it takes to ramp up other sources (which varies for different types of sources). A priority is also able to be set for certain loads such that higher priority loads stay on while lower priority loads are disconnected for a short time to cover the ramp up delay. In the case of one or more load port failures, the source port powers are throttled down without affecting other, active loads.

In the case of source port transients, there is a need to move away from conventional controls and implement an emergency mode for steering power to the loads. There are many types of emergency modes that are able to be utilized, including storing switching patterns corresponding to different emergency modes, deliberate change of control gains only while in emergency mode and then settling down to normal gains while in emergency mode, or adopting a different non-linear control scheme to control the state of the machine or to control the identified and critical state trajectories. For deeper and/or longer-lasting sags classified as transient(s), when the source port is unable to deliver rated or required and/or assigned power, either another source is ramped up to supply power for a duration or certain loads are prioritized to stay on while lower priority loads are switched off and resumed after the transient(s) has/have subsided. For surges, as long as the surge remains within the safe operating area (SOA) of the device, the port is able to deliver more than the steady-state rated power for a transient case. In this case, the control system goes into emergency mode to detect this situation and compensate for the extra power while continuing to deliver the required power levels for the loads.

Figure 3:
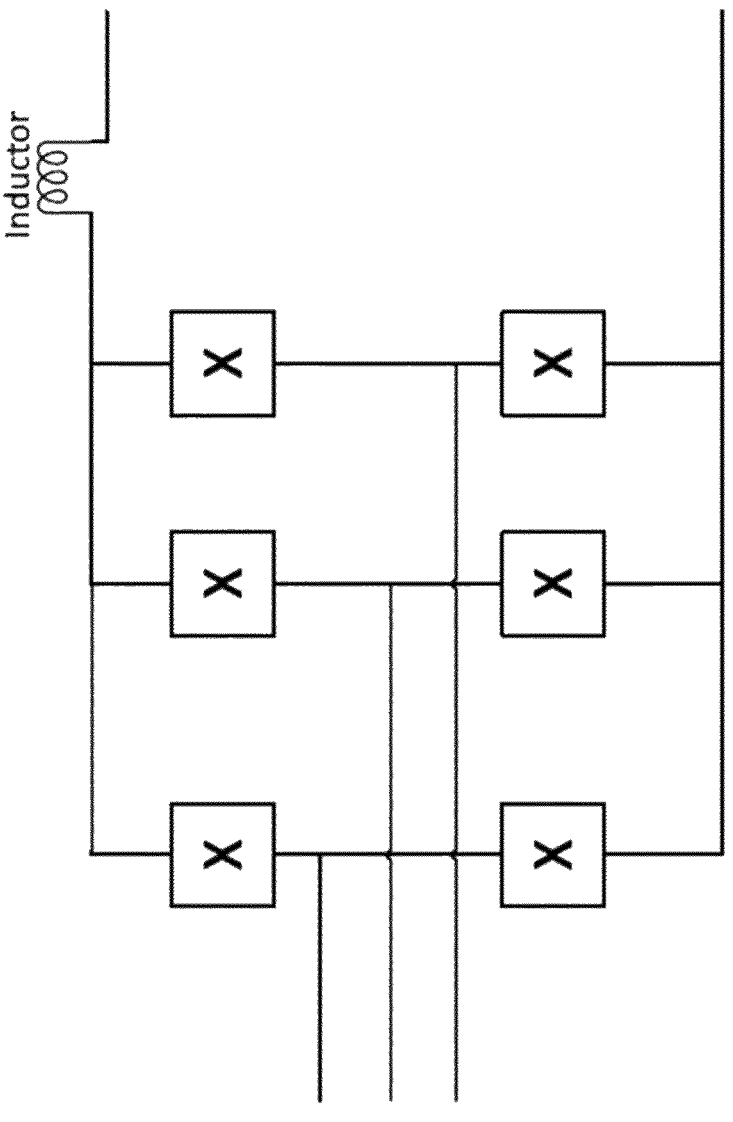
FIG. 3 is a circuit diagram of a three-pole alternating current (AC) port according to one embodiment of the present invention.
Figure 6:
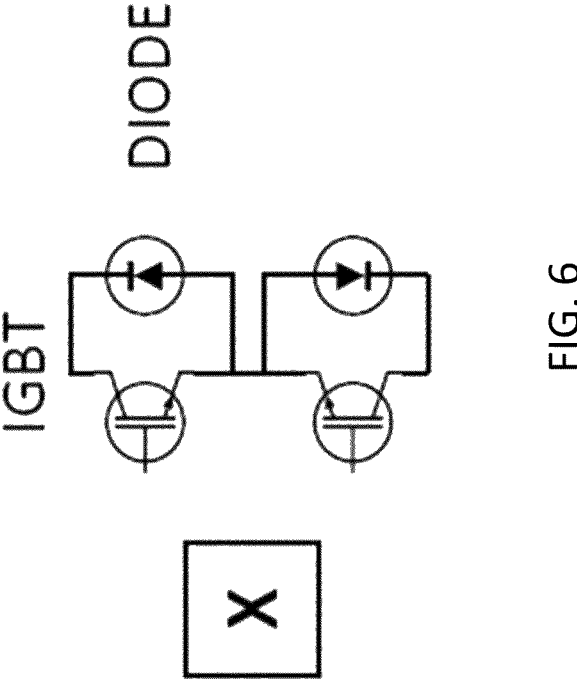
FIG. 6 is a circuit diagram of an insulated-gate bipolar transistor (IGBT) used in one or more ports of a modular, multiport power conversion system according to one embodiment of the present invention.
Figure 5:
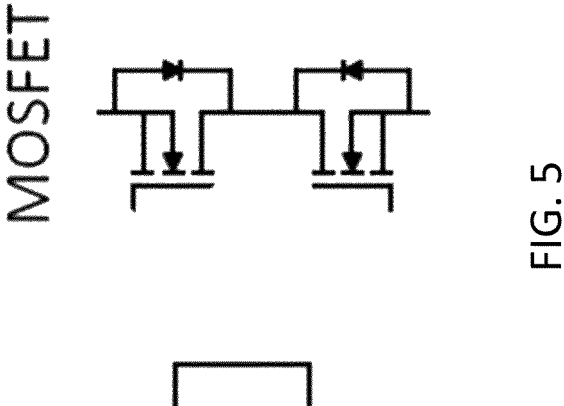
FIG. 5 is a circuit diagram of a MOSFET used in one or more ports of a modular, multiport power conversion system according to one embodiment of the present invention.

FIG. 3 is a circuit diagram of a three-pole alternating current (AC) port according to one embodiment of the present invention. AC ports are particularly useful for connecting to power sources, as power generation typically produces alternating current, even where the final power consuming devices require DC. In one embodiment, the Xs shown in FIG. 3 represent transistors in the circuit of the AC port, such as, but not limited to, metal-oxide semiconductor field effect transistors (MOSFETs), as shown in FIG. 5 or insulated-gate bipolar transistors (IGBTs), as shown in FIG. 6.

Figure 4:
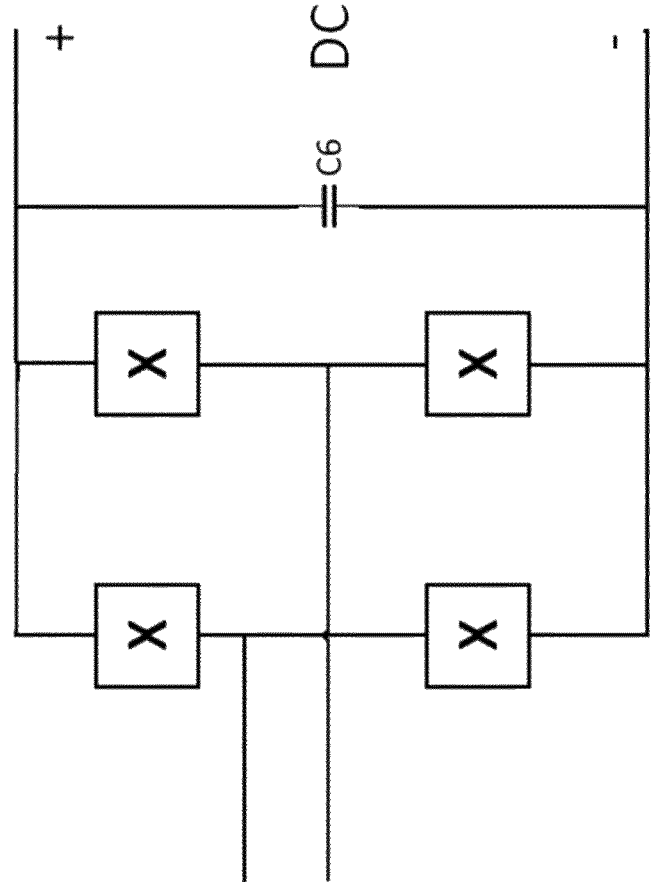
FIG. 4 is a circuit diagram of a direct current (DC) port of a modular, multiport power conversion system according to one embodiment of the present invention.
Figure 8:
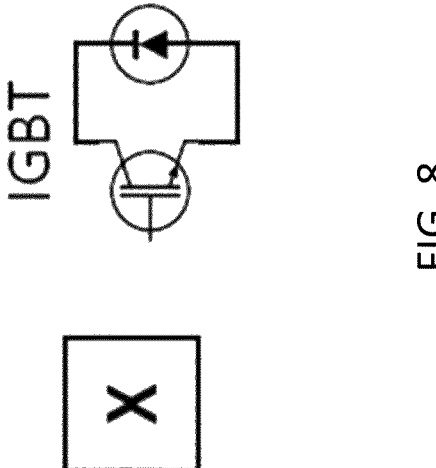
FIG. 8 is a circuit diagram of an IGBT used in one or more DC ports of a modular multiport power conversion system according to one embodiment of the present invention.
Figure 7:
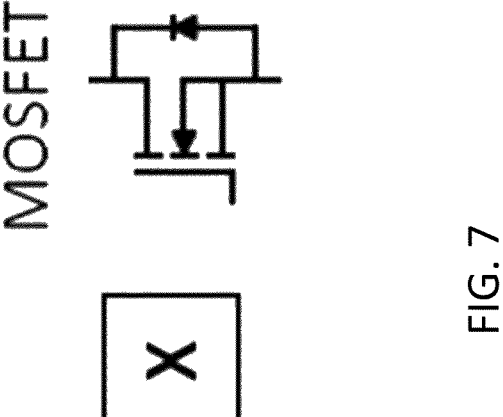
FIG. 7 is a circuit diagram of a MOSFET used in one or more DC ports of a modular, multiport power conversion system according to one embodiment of the present invention.

FIG. 4 is a circuit diagram of a direct current (DC) port of a modular, multiport power conversion system according to one embodiment of the present invention. DC ports are often, though not limited to, power consuming devices and/or batteries for storing and providing power to the grid. Therefore, having both the ports shown in FIGS. 3 and 4 helps to allow power generating sources and power consuming nodes to attach to the same power system. Preferably, for DC port applications, the Xs shown in FIG. 4 are replaced with the MOSFET shown in FIG. 7 or the IGBT shown in FIG. 8, but not both. However, similar to FIG. 3, in one embodiment, the Xs shown in FIG. 4 represent transistors in the circuit of the AC port, such as, but not limited to, MOSFETs as shown in FIG. 5 or IGBTs as shown in FIG. 6, but not a mixture of both.

Figure 9:
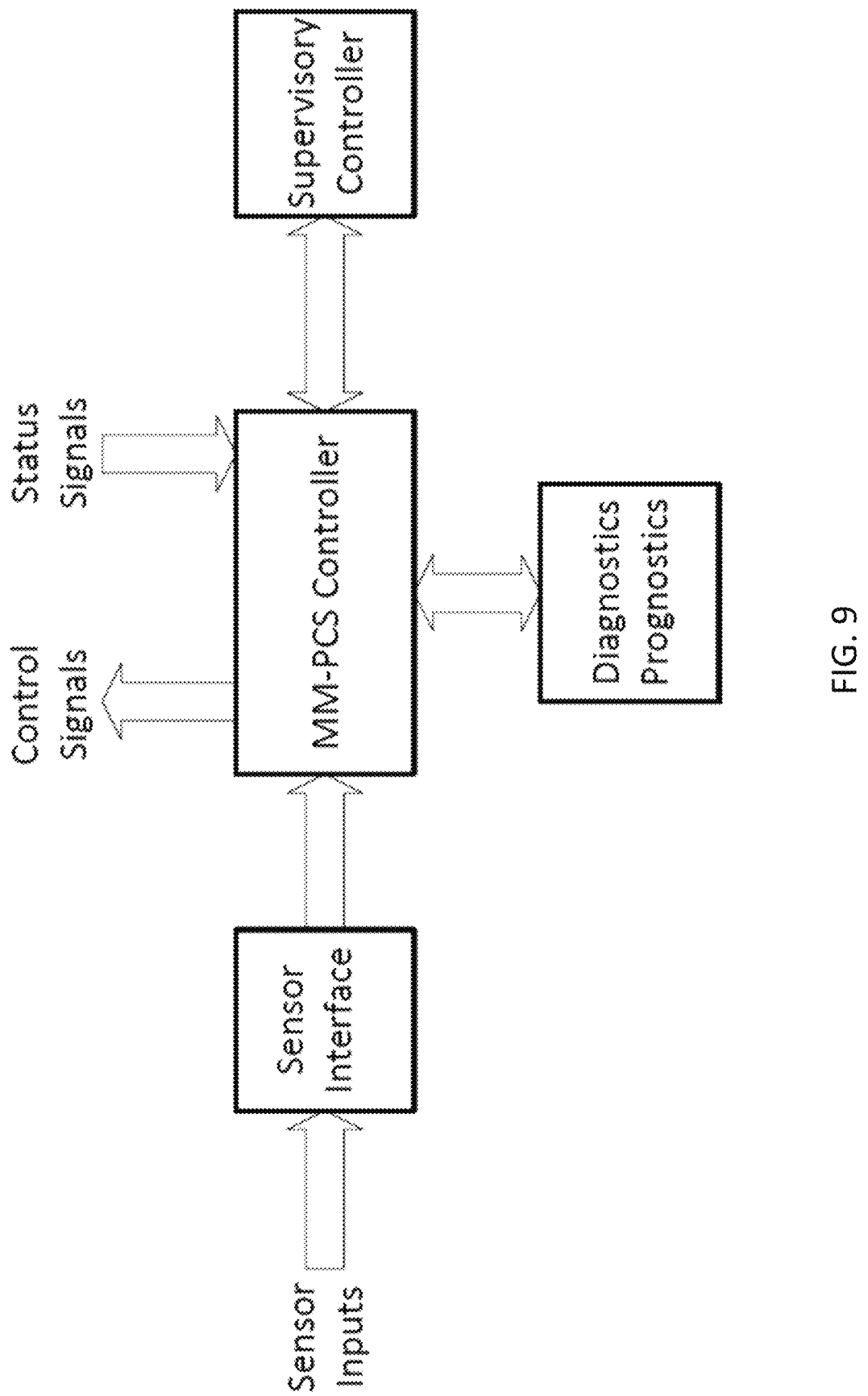
FIG. 9 is a schematic diagram of a system including a modular, multiport power conversion system according to one embodiment of the present invention.

FIG. 9 is a schematic diagram of a system including a modular, multiport power conversion system according to one embodiment of the present invention. In one embodiment, operation of the PCS is directed by at least one MM-PCS controller. In one embodiment, the MM-PCS controller is configured to receive status data from one or more sensors. In one embodiment, the PCS includes at least one sensor monitoring each port of the PCS. If a sensor detects that a port has failed, or transmits a sensed value that indicates failure, then a status update message or respective value is transmitted to the MM-PCS controller, allowing the MM-PCS controller to issue control signals to automatically galvanically isolate and cut-off the compromised port from central transformer, preventing the damaged ports from parasitically drawing current from the PCS or from potentially causing arc flashes or other harmful phenomena between the damaged port and other ports in the system. In one embodiment, the MM-PCS controller is able to connect or disconnect individual ports through the use of programmable breakers, and/or solid-state breakers, and/or AC/DC contactors and/or vacuum breakers, and/or combinations of these breakers and contactors on each port.

The galvanic isolation of the present system is achieved by the use of separate windings to connect each port to the transformer. Current is able to flow only from one winding to another winding by magnetic flux change in the transformer. This change requires explicit switching from each of the involved ports (or more specifically transistors in each port) to allow energy flow, providing for extremely high selectivity in flow path. In one embodiment, programmable contactors provide for selective remote (manual or automatic) transistor switching to allow for the selective switching mechanism. This sort of switching also allows the transformer to provide controlled incoming current to individual loads even where the overall current from all energy resources into the system is quite high, preventing overcurrent from potentially damaging the attached loads.

In one embodiment, multiple PCS units are able to be connected either in parallel or in series, allowing for power scaling as well as voltage scaling of the system, especially to medium voltage levels.

Medium voltage plays an important role in power infrastructure, acting as a key intermediate between high-voltage transmission and low-voltage distribution, allowing further subdivision and segmentation of a power grid topology. Medium voltage allows higher-power supply to devices, systems, infrastructure, and buildings for which typical low-voltage distribution is not sufficient. Some voltage sources, especially renewable energy sources, operate with medium voltage and require an efficient system to properly integrate them into an existing power grid.

In the art, medium voltage (MV) is defined as a range from typically 1 kV to 35-100 kV. Different accepted standards setting organizations, such as IEC, IEEE, ANSI, NECA, and NEMA, define this range differently. However, prior art transformers are typically designed with regard to IEEE and IEC standards. In one embodiment, medium voltage is defined according to IEC standards, between 1 kV and 35 kV. Likewise, low voltage (LV) is defined as any voltage below 1 kV, and high voltage (HV) is defined as any voltage above 35 kV.

In traditional power grids, MV distribution transformers are used to step down utility voltage to MV voltage levels needed in a variety of infrastructure including commercial and industrial buildings. However, these MV distribution transformers are physically bulky, have long procurement lead times and introduce inefficiencies in space and deployment flexibility. These prior art transformers also require extensive circuitry and components, such as AC-to-DC power converters. Therefore, there is a need for a system which minimizes physical footprint by consolidating multiple functions into one device and therefore, eliminates the need for a conventional distribution transformer.

In one embodiment, the ports of the PCS unit or the plurality of PCS units are operable to connect and operate with medium voltage (MV) sinks and/or sources. The PCS unit or plurality of PCS units is operable to step up or step down the voltage and/or current from individual sources or to individual loads as needed to address a variety of needs. Therefore, the PCS unit or plurality of PCS units is capable of acting as a buck converter (i.e., stepping down voltage) between one or more sources and one or more sinks or a boost converter (i.e., stepping up voltage) depending on the needs of the specific situation. For medium voltage applications, the PCS unit or plurality of PCS units is operable to receive a high voltage from a high voltage source, step down the voltage, and output a medium voltage connected to a medium voltage load. In an alternative embodiment, the PCS unit or plurality of PCS units is operable to receive an AC medium voltage from a medium voltage source and interface seamlessly with one or multiple DC sources/loads, single-phase AC sources/loads, three-phase AC sources/loads, medium/high voltage AC source/loads. The present invention is additionally operable to accept or deliver medium voltage for the purpose of power transmission or delivery within a power grid, acting similarly to a transformer substation in this configuration.

In one embodiment, a PCS unit is operable to be used for medium voltage applications. In an alternative embodiment, a plurality of PCS units is operable to be connected in a plurality of configurations to provide for medium voltage applications. The PCS unit or plurality of PCS units is operable to contain a plurality of ports including both alternating current (AC) and direct current (DC) ports as either sources or sinks for power. DC ports are operable to have positive or negative polarity, while AC ports include single phase or three-phase AC ports. In one embodiment, the plurality of ports are operable to connect with medium voltage sources and/or loads. The PCS unit or plurality of PCS units enables seamless integration of various AC and/or DC sources and loads, including for example, building loads, batteries, fuel cells, solar panels, and/or IT loads, without the need for additional AC to DC or DC to DC power converters.

For example, and not limitation, the ports of the PCS unit are operable to connect to medium-voltage sinks such as hospitals, commercial buildings, factories and industrial plants, public transport systems such as subways, electrified rail, and airports, construction sites, data centers, or a further medium-voltage distribution network.

In a further non-limiting example, the ports of the PCS unit are operable to connect to medium-voltage sources such as an upstream distribution network and renewable energy sources such as wind farms, solar arrays, hydroelectric dams, and geothermal plants.

In one embodiment, the present invention is operable to be used for power transformation and delivery within a power grid, acting as a high-voltage (HV) to medium-voltage (MV) power distribution transformer. At least one PCS port is operable to connect to at least one high voltage source, for example an upstream power plant, via a high-voltage power transmission network. At least one other PCS port is operable to connect to at least one medium-voltage sink, for example a downstream medium-voltage power transmission network and/or directly to a medium-voltage building, system, or infrastructure such as a commercial building. At least one further PCS port is operable to connect to at least one medium-voltage source, such as a renewable energy source.

In another embodiment, the present invention acts as a medium-voltage (MV) to low-voltage (LV) power distribution transformer. At least one PCS port is operable to connect to at least one medium voltage source, such as an upstream medium-voltage transmission network or a renewable energy source. At least one other PCS port is operable to connect to at least one low voltage source, such as residential homes, small commercial buildings, or electric vehicle charging stations.

In one embodiment, the present invention is used in a commercial building. Depending on the size of the commercial building, there may exist a plurality of HV, MV, and LV sources and/or sinks, which would conventionally require extensive transformation circuitry to properly integrate and synchronize. In this embodiment, at least one PCS port is operable to connect to at least one high-voltage source, such as a high-voltage power transmission network. At least one other PCS port is operable to connect to at least one medium-voltage source, such as a medium-voltage power transmission network or renewable energy sources such as a rooftop solar panel array. At least one further PCS port is operable to connect to at least one medium-voltage sink, such as a heating, ventilation, and air conditioning (HVAC) system, an elevator, or an escalator. At least one PCS port is operable to connect to at least one low-voltage sink, such as the commercial building's electrical wiring system.

In one embodiment, the present invention is operable to connect to at least one electric vehicle (EV) charging station, utilizing a MV source to charge a LV load. In a further embodiment, the power router supplies MV and/or LV options for the EV charging station.

In one embodiment, each PCS unit has its own controller for controlling the voltage supplied to each port of the corresponding PCS unit and allowing for control of power flow between each port. In one embodiment, a supervisory controller operates over multiple PCS units, providing higher level voltage regulation. In one embodiment, the supervisory controller is operable to transmit power flow control commands to one or more individual MM-PCS controllers and/or directly to individual ports of one or more PCS units. In an embodiment of the present invention having multiple PCS units, only the series or parallel ports are electrically connected. In one embodiment, the one or more individual MM-PCS controllers are connected to the at least one supervisory controller wirelessly via one or more dedicated signal frequencies, through at least one EtherCAT cable, and/or through one or more wireless networks (e.g., wireless local area networks, or WLAN, such as WI-FI, wireless personal area networks, or WPAN, such as BLU-ETOOTH). In one embodiment, one or more individual MM-PCS controllers are connected to at least one energy management system (EMS) (e.g., at least one server) operable to transmit commands to one or more individual MM-PCS controllers and/or to one or more supervisory controllers. In one embodiment, the one or more individual MM-PCS controllers are operable to communicate via communication interfaces compliant with Institute of Electrical and Electronics Engineers (IEEE), International Electrotechnical Commission (IEC), American National Standards Institute (ANSI) and/or other emerging protocols for grid interoperability and integration.

In one embodiment, the MM-PCS controller automatically performs diagnostic evaluations of the PCS based sensor data received from a plurality of sensors, allowing the MM-PCS controller to synthesize this data to determine the overall health of the system. In one embodiment, diagnostics and prognostics are performed by a dedicated diagnostic and prognostic module interfaced with the MM-PCS controller. In one embodiment, the diagnostic and prognostic module is a cloud-based module, while, in another embodiment, the diagnostic and prognostic module is a component of a processor of the MM-PCS controller. In one embodiment, the MM-PCS controller is configured to automatically transmit status updates from the PCS as a whole to at least one server and/or at least one database. In one embodiment, the MM-PCS controller is connected, either via cable or wirelessly, to at least one supervisory controller operable to provide new operational parameters to the MM-PCS controller to adjust to different needs of the system (e.g., adjusting a maximum total voltage drop, adjusting a maximum current drawn by specific sinks, etc.). In one embodiment, the MM-PCS controller is capable of controlling a percentage of power delivered or consumed by each port (e.g., port 1 delivers 20% of power, port 2 delivers 80% of power, etc.). In another embodiment, the amount of power delivered or consumed by each port is based on the number of windings in each port's connection to the central transformer.

In one embodiment, the MM-PCS controller is programmed to include at least one schedule of energy resources, indicating that different percentages of power will be delivered from different power sources at different times and/or that different percentages of power will be delivered to different power consuming ports at different times. By way of example and not limitation, in one embodiment, at least one solar cell is attached to a first port of the PCS. During the day time, the MM-PCS controller is configured to draw 50% of the total power input from the first port, as the power generation from the at least one solar cell will be higher. However, during the night time, the MM-PCS controller is configured to only draw 0 to 5% of total power input from the first port, reflecting decreased power production. In one embodiment, the schedule is not based on times of a day, but based on periodically cycling different sources. For example, in one embodiment, power is drawn from a first port for an hour and then drawn from a second port for an hour, with alternation back and forth. In another embodiment, the energy management system can impose any schedule on the source and sink ports to minimize and/or maximize any function.

The MM-PCS controller and/or supervisory controller is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The MM-PCS controller and/or supervisory controller is operable to use any of the aforementioned learning techniques alone or in combination.

Further, the MM-PCS controller and/or supervisory controller is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The MM-PCS controller and/or supervisory controller is preferably operable to recommend and/or perform actions based on historical data, external data sources, ML, AI, NNs, and/or other learning techniques. The MM-PCS controller and/or supervisory controller is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques. In one embodiment, the controller includes software algorithms for adaptive real-time optimization, predictive analytics, fault prediction, self-diagnostics, prognostics, and/or autonomous maintenance.

In one embodiment, predictive analytics and/or machine learning techniques are used by the MM-PCS controller and/or supervisory controller to optimize percentages of power drawn from specific power sources or distributed to specific power consuming devices over time. For example, in one embodiment, the machine learning is trained on historical data of power usage and/or power supply from each port in order to develop a baseline power curve for each port. Baselining helps the MM-PCS controller and/or supervisory controller to determine peak demand times for power consuming nodes on the grid as well as peak power generation times for individual power sources attached to the PCS. In one embodiment, the MM-PCS controller is operable to perform predictive control utilizing artificial intelligence, machine learning, adaptive or heuristic algorithm, neural networks, or any other suitable predictive control technology.

One problem posed by the present invention is that of grid forming capabilities, especially when the system is operating in an islanding, as opposed to grid-connected, mode. With large-scale, fossil-fuel (in addition to nuclear and hydroelectric) based energy resources, large spinning turbines have traditionally been used to supply power to the grid. The spinning energy in these turbines provides inertia to the grid that helps stabilize between energy transitions. In particular, this process helps prevent the system's energy from suddenly dropping, providing time for rebalancing supply and loads. Many renewable resources, including solar cells and batteries, however, do not provide such inertia, as they use inverters which are able to flip on and off very quickly, without energy remaining in the form of a spinning turbine. While inverter-based devices are typically able to respond to changes in required frequency more quickly, and therefore have reduced need for inertia, this fails to account for the entirety of the issue. When multiple generators are present, the lack of energy sources with substantial inertia creates an issue with synchronizing the energy sources, creating a need for a grid-forming inverter to set a frequency that other devices follow. An additional issue is with large and potentially sudden peak currents, as often occur with devices such as heating, ventilation, and air conditioning (HVAC) devices. Taken alone, high peak currents are likely to cause significant issues for smaller scale energy resources, such as solar cells.

However, the present system addresses grid forming issues common in renewable resources by providing a connection to multiple energy sources simultaneously, which are able to work together to provide peak currents in order to accommodate new devices coming online. In one embodiment, the system includes a plurality of connected energy sources that combine to contribute a single, larger load current that does not overwhelm individual devices. In one embodiment, the contribution of current from each energy source is dependent on the transient impedance and/or voltage-current curves for each device. In one embodiment, the transient impedance for each source is determined, in real time, by at least one impedance sensor attached to each energy source. In one embodiment, each of the at least one impedance sensor introduces a small perturbation signal in order to determine the transient impedance. In one embodiment, the peak current provided by the present system is at least ten times the average root mean squared (RMS) current of the circuit for at least one second. The capacitor between each battery in the system and the winding assists in preventing the peak current from overwhelming the transient impedance of the batteries, thereby stopping them from being instantaneously drained.

Location data is created in the present invention using one or more hardware and/or software components. By way of example and not limitation, location data is created using the Global Positioning System (GPS), low energy BLUETOOTH based systems such as beacons, wireless networks such as WIFI, Radio Frequency (RF) including RF Identification (RFID), Near Field Communication (NFC), magnetic positioning, and/or cellular triangulation. By way of example, location data is determined via an Internet Protocol (IP) address of a device connected to a wireless network. A wireless router is also operable to determine identities of devices connected to the wireless network through the router, and thus is operable to determine the locations of these devices through their presence in the connection range of the wireless router.

Figure 10:
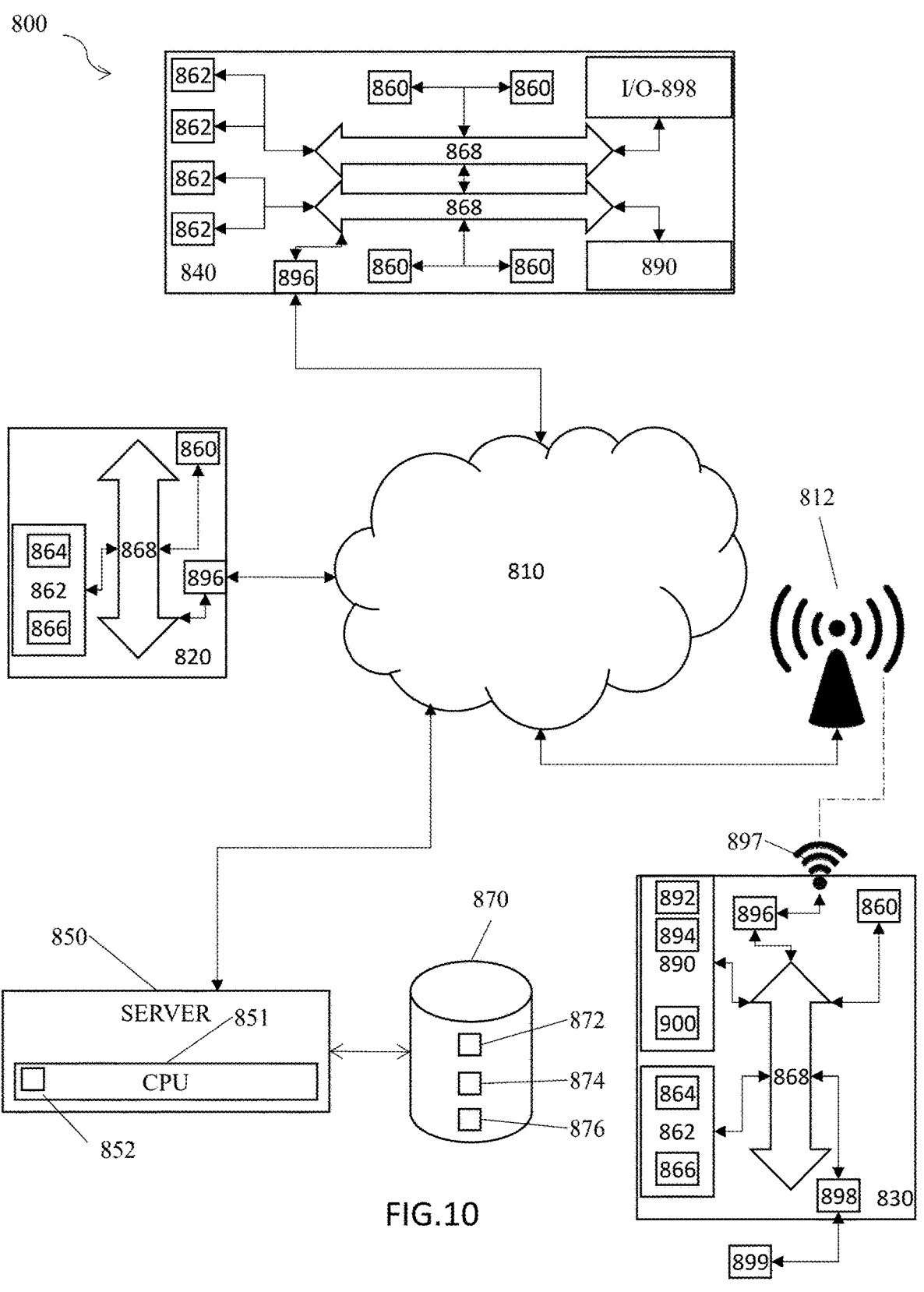
FIG. 10 is a schematic diagram of a system of the present invention.

FIG. 10 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICRO-WAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 10, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 10, is operable to include other components that are not explicitly shown in FIG. 10, or is operable to utilize an architecture completely different than that shown in FIG. 10. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A modular multiport power system, comprising:
   a central transformer;
   a plurality of galvanically isolated ports coupled via inductive, capacitive, resistive, or hybrid coupling methods to the central transformer via windings;
   one or more voltage sensors and/or one or more current sensors for each of the plurality of galvanically isolated ports configured to detect voltage and/or current characteristics of each of the plurality of galvanically isolated ports; and
   at least one controller operable to selectively isolate one or more of the plurality of galvanically isolated ports;
   wherein at least one first port of the plurality of galvanically isolated ports is connected to one or more sources;
   wherein at least one second port of the plurality of galvanically isolated ports is connected to one or more loads;
   wherein the at least one controller is configured to selectively charge and/or discharge the one or more sources and the one or more loads;
   wherein the at least one controller is operable to detect a fault of one or more of the plurality of galvanically isolated ports based on the voltage and/or current characteristics using a fault detection algorithm, wherein the fault comprises an undercurrent condition, an overcurrent condition, an undervoltage condition, an overvoltage condition, and/or arcing;

wherein each of the plurality of galvanically isolated ports includes a plurality of metal-oxide semiconductor field effect transistors (MOSFETs), integrated gate bipolar transistors (IGBTs), gallium nitride (GaN) or silicon carbide (SiC) devices, and/or any other suitable semiconductor devices in an AC switch or H-bridge configuration; and wherein the plurality of galvanically isolated ports includes AC and/or DC ports.

2. The system of claim 1, wherein each of the plurality of galvanically isolated ports includes a decoupling impedance module spanning connection points between the plurality of galvanically isolated ports and the central transformer, wherein the decoupling impedance module includes an inductor, a capacitor, a resistor, or combinations thereof.

3. The system of claim 1, wherein the plurality of galvanically isolated ports includes a combination of AC and DC ports.

4. The system of claim 1, wherein the one or more sources and/or the one or more loads includes at least one medium voltage source and/or medium voltage load.

5. The system of claim 1, wherein the one or more current sensors include open-loop, closed-loop, or flux gate current sensors.

6. The system of claim 1, wherein the at least one controller utilizes zero-voltage switching (ZVS) or zero current switching (ZCS) to manipulate current and/or voltage drawn by or supplied from the plurality of galvanically isolated ports.

7. The system of claim 1, wherein the at least one controller receives instructions to control a percentage of power drawn by or supplied from one of the plurality of galvanically isolated ports, and wherein the at least one controller is operable to adjust a duty cycle and/or phase for at least one of the plurality of galvanically isolated ports to achieve meet the percentage of power drawn by or supplied from the one of the plurality of galvanically isolated ports.

8. The system of claim 1, wherein the at least one controller includes at least one artificial intelligence module configured to determine which of the plurality of galvanically isolated ports to disconnect, ramp up, or ramp down based on the voltage and/or current characteristics detected by the one or more voltage sensors and/or one or more current sensors.

9. The system of claim 1, wherein the plurality of galvanically isolated ports includes four or more ports.

10. The system of claim 1, wherein the one or more sources and the one or more loads include solar PV, wind turbines, fuel cells, hydrogen systems, flywheels, capacitors, diesel gensets, natural gas generators, and/or any other energy storage devices.

11. The system of claim 1, wherein the at least one controller includes one or more cybersecurity modules configured to detect, mitigate, or respond to cyber threats, unauthorized access, and/or faults, thereby providing resilience and operational continuity for the system.

12. The system of claim 1, wherein the at least one controller includes software algorithms for adaptive real-time optimization, predictive analytics, fault prediction, self-diagnostics, prognostics, and/or autonomous maintenance.

13. The system of claim 1, wherein the at least one controller is operable to communicate via interfaces compliant with the Institute of Electrical and Electronics Engineers (IEEE), International Electrotechnical Commission (IEC), American National Standards Institute (ANSI) and/or any other standard for grid interoperability and integration.

14. A modular multiport power system, comprising:
a central transformer;
a plurality of galvanically isolated ports coupled via inductive, capacitive, resistive, or hybrid coupling methods to the central transformer via windings;
one or more voltage sensors and/or one or more current sensors for each of the plurality of galvanically isolated ports configured to detect voltage and/or current characteristics of each of the plurality of galvanically isolated ports; and
at least one controller operable to selectively manipulate one or more of the plurality of galvanically isolated ports;
wherein each of the plurality of galvanically isolated ports are connected to one or more sources and/or loads;
wherein the at least one controller is operable to detect a fault of one or more of the plurality of galvanically isolated ports based on the voltage and/or current characteristics using a fault detection algorithm, wherein the fault comprises an undercurrent condition, an overcurrent condition, an undervoltage condition, an overvoltage condition, and/or arcing;
wherein the at least one controller receives instructions to control a percentage of power drawn by or supplied from one of the plurality of galvanically isolated ports; and
wherein the at least one controller is operable to adjust respective on-off duty cycles and phasing of the on-off duty cycles with respect to other ports, to achieve the percentage of power drawn by or supplied from the one of the plurality of galvanically isolated ports.

15. The system of claim 14, wherein each of the plurality of galvanically isolated ports includes a decoupling impedance module, wherein the decoupling impedance module includes an inductor, a capacitor, a resistor, or combinations thereof.

16. The system of claim 14, wherein the plurality of galvanically isolated ports includes a combination of AC and DC ports.

17. The system of claim 14, wherein the one or more sources and/or loads includes at least one medium voltage source and/or medium voltage load.

18. The system of claim 14, wherein the one or more current sensors include open-loop, closed-loop, or flux gate current sensors.

19. The system of claim 14, wherein the system includes a user interface, and wherein user interface is configured to receive data from the one or more voltage sensors and/or the one or more current sensors and to indicate which ports have faults.

20. The system of claim 14, wherein the one or more sources and/or loads include at least one battery, at least one solar cell, at least one wind turbine, at least one power plant, at least one microgrid, at least one steam turbine, and/or at least one electric vehicle.

21. The system of claim 14, wherein the at least one controller utilizes zero-voltage switching (ZVS) or zero current switching (ZCS) to manipulate current and/or voltage drawn by or supplied from the plurality of galvanically isolated ports.

22. The system of claim 14, wherein the plurality of galvanically isolated ports includes four or more ports.

* * * * *